United States Patent
Egi

(10) Patent No.: US 9,606,524 B2
(45) Date of Patent: Mar. 28, 2017

(54) CONTROL APPARATUS, CONTROL SYSTEM AND CONTROL METHOD

(75) Inventor: Mamoru Egi, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 571 days.

(21) Appl. No.: 13/877,930

(22) PCT Filed: Mar. 16, 2011

(86) PCT No.: PCT/JP2011/056227
§ 371 (c)(1),
(2), (4) Date: Apr. 5, 2013

(87) PCT Pub. No.: WO2012/049866
PCT Pub. Date: Apr. 19, 2012

(65) Prior Publication Data
US 2013/0197688 A1   Aug. 1, 2013

(30) Foreign Application Priority Data
Oct. 13, 2010   (JP) .................................. 2010-230342

(51) Int. Cl.
*G05B 19/18*   (2006.01)
*G05B 19/416*   (2006.01)

(52) U.S. Cl.
CPC .......... *G05B 19/18* (2013.01); *G05B 19/416* (2013.01); *G05B 2219/41408* (2013.01); *G05B 2219/42244* (2013.01); *G05B 2219/43061* (2013.01)

(58) Field of Classification Search
CPC ........... G05B 2219/42244; G05B 2219/43061; G05B 2219/41408
(Continued)

(56) References Cited

U.S. PATENT DOCUMENTS 4,757,457 A   7/1988   Matsumoto
5,740,327 A *  4/1998   Funaya ................ G05B 19/416
                                              700/254
(Continued)

FOREIGN PATENT DOCUMENTS

CN   1155688 A    7/1997
CN   101627281 A  1/2010
(Continued)

OTHER PUBLICATIONS

Lin et al., "Development of a dynamics-based NURBS interpolator with real-time look-ahead algorithm" International Journal of Machine Tools & Manufacture vol. 47, Issue 15, Dec. 2007, pp. 2246-2262.*

(Continued)

*Primary Examiner* — Carlos Ortiz Rodriguez
*Assistant Examiner* — Emilio J Saavedra
(74) *Attorney, Agent, or Firm* — Mots Law, PLLC

(57) ABSTRACT

There is provided a control apparatus for controlling a device having a movable unit movable by a plurality of drive shafts. The control apparatus includes: target trajectory generation means for generating a target trajectory for a movement section defined by a start point and an end point; remaining distance estimation means for estimating a remaining distance along the target trajectory from a current position to the end point; acceleration calculation means for calculating an acceleration involved in varying a current movement velocity of the movable unit to a target velocity corresponding to a movement velocity to be satisfied by the movable unit at the end point of the target trajectory, such that a distance that the movable unit will have traveled substantially matches the remaining distance; and movement velocity updating means for calculating a new target (Continued)

(a)

(b)

movement velocity value by correcting the current movement velocity with the acceleration calculated.

21 Claims, 17 Drawing Sheets

(58) Field of Classification Search
USPC .......................................................... 700/186
See application file for complete search history.

(56) References Cited

U.S. PATENT DOCUMENTS

| | | | |
|---|---|---|---|
| 5,832,188 | A | 11/1998 | Papiernik |
| 6,002,231 | A | 12/1999 | Dirkx et al. |
| 2009/0102411 | A1 | 4/2009 | Miller et al. |
| 2010/0103096 | A1 | 4/2010 | Yamamoto et al. |

FOREIGN PATENT DOCUMENTS

| | | |
|---|---|---|
| EP | 0917033 A2 | 5/1999 |
| FR | 2003744 A1 | 11/1969 |
| GB | 1258187 A | 12/1971 |
| JP | 61-156309 A | 7/1986 |
| JP | 1-147610 A | 6/1989 |
| JP | 6-75621 A | 3/1994 |
| JP | 7-64620 A | 3/1995 |
| JP | 7-104824 A | 4/1995 |
| JP | 7-210233 A | 8/1995 |
| JP | 11-179685 A | 7/1999 |
| JP | 2000-148223 A | 5/2000 |
| JP | 2000-163114 A | 6/2000 |
| JP | 2003-15714 A | 1/2003 |
| JP | 2006-72598 A | 3/2006 |

OTHER PUBLICATIONS

Yau et al., "Fast Bezier interpolator with real-time look-ahead function for high-accuracy machining" International Journal of Machine Tools and Manufacture vol. 47, Issue 10, Aug. 2007, pp. 1518-1529.*

Cheatham et al., Direct Process Control Using n-Dimensional NURBS Curves Computer-Aided Design & Applications, vol. 2 N. 6, 2005 pp. 825-834.*

Red et al., "A dynamic optimal trajectory generator for Cartesian Path following" vol. 18, No. 5, Sep. 2000, pp. 451-458.*

Red et al., "On-line Cartesian trajectory control of mechanisms along complex curves" Robotica vol. 15 No. 3 (May 1997): 263-274.*

Olabi et al., "Enhanced Trajectory Planning for Machining With Industrial Six-Axis Robots" IEEE International Conference on Industrial Technology (ICIT), 2010 Mar. 14-17, 2010 pp. 500-506.*

Hain et al., "Precise flattening of cubic Bezier segments" Proceedings of the 16th Canadian Conference on Computational Geometry, CCCG'04, Concordia University, Montréal, Québec, Canada, Aug. 9-11, 2004. 2004 pp. 180-183.*

"SureMath: the math software for 21st century problem solving" Oct. 7, 1999 accessed via https://web.archive.org/web/19991007185634/http://www.hawaii.edu/suremath/jrootsCubic.html.*

"Math 124 Cubic Bezier curves" http://www.math.ucla.edu/~baker/149.1.02w/handouts/dd_splines.pdf accessed 2003 copy via https://web.archive.org/web/20080801000000*/http://www.math.ucla.edu/~baker/149.1.02w/handouts/dd_splines.pdf.*

The Chinese office action letter issued on Jul. 3, 2015 in the counterpart Chinese patent application.

* cited by examiner

CONTROL APPARATUS, CONTROL SYSTEM AND CONTROL METHOD

TECHNICAL FIELD

The present invention relates to a control apparatus for controlling a device having a movable unit movable by a plurality of drive shafts, a control system including the control apparatus, and a control method.

BACKGROUND ART

Conventionally, an automated apparatus such as so-called industrial robot and NC (Numerical Control) machine tool has been introduced in various industrial fields. The introduction of this apparatus allows enhancement of production efficiency.

This apparatus has a movable unit such as an arm for gripping a work and an end mill for shaping the work. This movable unit is movable by a plurality of drive shafts, and these drive shafts are driven by a servomotor or a stepping motor.

When this apparatus is used to shape the work, for example, a behavior thereof must be determined. As a method for determining the behavior, there are an off-line calculation scheme in which the behavior is calculated in advance, and an on-line calculation scheme in which the behavior is dynamically calculated during operation.

There have been proposed various techniques as a conventional technique for controlling the behavior of the apparatus. For example, according to a numerical controller disclosed in Japanese Patent Laying-Open No. 07-064620 (PTL 1), high-speed and high-accuracy velocity control in consideration of acceleration/deceleration control is possible, smooth driving on a spline curve is possible, abnormal vibrations of a machine tool can be reduced, and whether a higher priority is given to velocity or accuracy can be selected. More specifically, in the numerical controller disclosed in PTL 1, by suppressing abrupt acceleration/deceleration at a start point and an end point, mechanical vibrations can be suppressed, and deceleration stop is possible at a specified acceleration (deceleration) and without going beyond a target position.

According to a curve interpolation acceleration/deceleration control method disclosed in Japanese Patent Laying-Open No. 2000-148223 (PTL 2), there are obtained smooth acceleration and deceleration for high-speed movement in accordance with the shape of a curve.

According to an intra-interpolation curve acceleration/deceleration processing method disclosed in Japanese Patent Laying-Open No. 2000-163114 (PTL 3), a machine can be moved along an instructed trajectory regardless of a curvature of a curve.

According to an NC machining method disclosed in Japanese Patent Laying-Open No. 06-075621 (PTL 4), by adding a new sampling point to only a portion having a large curvature, a curve is approximated with the minimum number of sampling points (data) and an original figure which is smooth and small in shape difference is reproduced.

According to a numerical controller disclosed in Japanese Patent Laying-Open No. 01-147610 (PTL 5), interpolation control is performed by spline interpolation control.

As for an apparatus placed in a production line for mass-producing products of the same kind, a set value (machining program) such as a target trajectory may be preset and the apparatus may be operated in accordance with this set value. However, in a multikind and small quantity production line for producing various products, setting such a set value (machining program) for each product is difficult in terms of cost and the like. Thus, there is a demand for reducing production cost, for example, by using the common machining program and dynamically setting the target trajectory and the like in accordance with commodity specifications and the like.

CITATION LIST

Patent Literature

PTL 1: Japanese Patent Laying-Open No. 07-064620
PTL 2: Japanese Patent Laying-Open No. 2000-148223
PTL 3: Japanese Patent Laying-Open No. 2000-163114
PTL 4: Japanese Patent Laying-Open No. 06-075621
PTL 5: Japanese Patent Laying-Open No. 01-147610

SUMMARY OF INVENTION

Technical Problem

When the target trajectory is dynamically set as described above, it is difficult to precisely calculate a trajectory length thereof. Therefore, velocity setting on the target trajectory is difficult.

In addition, in a process of cutting and shaping the work, a movement velocity of the tool such as the end mill affects an amount of cutting, and thus, it is important to control not only a position but also the movement velocity of the tool. In other words, fluctuations in acceleration of the tool lead to an appearance abnormality or poor quality of a processed surface. Therefore, there is a demand for maintaining the acceleration during movement as constant as possible. Particularly in a straight portion, fluctuations in acceleration are likely to bring a malfunction.

Furthermore, in the process of cutting and shaping the work, a section undergoes shaping, and then, another section undergoes shaping in some cases. Therefore, it is preferable to maintain the movement velocity at the end point of the set target trajectory at a predetermined target value. Otherwise, the movement velocity becomes discontinuous near the end point of the target trajectory, or the acceleration becomes discontinuous in a subsequent straight section.

The techniques disclosed in aforementioned PTLs 1 to 5 do not have solved these problems.

For example, in the method for limiting the acceleration to a fixed value as disclosed in PTL 1, the timing of arrival at the end point of the target trajectory varies depending on an error about a calculated distance to the end point or fluctuations in velocity during an increase in velocity. Therefore, the movement velocity at the end point cannot be maintained at the predetermined target value.

In addition, in the techniques disclosed in PTLs 2 and 3, the interpolation curve and the target velocity are designed in advance (off-line calculation scheme), and thus, it is difficult to dynamically change the target trajectory and the end point. Even if the target trajectory and the end point can be dynamically changed, there is a possibility that, when fluctuations in velocity occur during movement due to output saturation and the like, excessive fluctuations in velocity occur due to recovery from the velocity fluctuations, and malfunctions such as an appearance abnormality and quality fluctuations of the processed surface occur, because the target velocity is designed in a fixed manner.

Furthermore, in order to reach the end point of the target trajectory such that the movement velocity attains the predetermined target value, the trajectory length (remaining distance) from a current position to the end point must be calculated in each control period and a velocity instruction must be calculated, which leads to an increase in amount of operation. Therefore, completion of the operation processing in each control period is not easy due to limitations of the processing capability and the like.

Thus, the present invention has been made to solve the above problems, and an object of the present invention is to provide a control apparatus, a control system and a control method, in which a velocity at an end point of a target trajectory can be maintained at a target value even when the target trajectory is dynamically generated.

Solution to Problem

According to an aspect of the present invention, there is provided a control apparatus for controlling a device having a movable unit movable by a plurality of drive shafts. The control apparatus includes: target trajectory generation means for generating a target trajectory for a movement section defined by a start point and an end point; remaining distance estimation means for estimating a remaining distance along the target trajectory from a current position to the end point; acceleration calculation means for calculating an acceleration involved in varying a current movement velocity of the movable unit to a target velocity corresponding to a movement velocity to be satisfied by the movable unit at the end point of the target trajectory, such that a distance that the movable unit will have traveled substantially matches the remaining distance; and movement velocity updating means for calculating a new target movement velocity value by correcting the current movement velocity with the acceleration calculated.

Preferably, the acceleration calculation means calculates the acceleration based on the current movement velocity, the target velocity, and the distance.

Preferably, the acceleration calculation means calculates the acceleration in each control period to vary the current movement velocity to the target velocity at a fixed rate.

Preferably, the remaining distance estimation means sets a predetermined number of sampling points for a section along the target trajectory from the current position to the end point and also interpolates the sampling points to estimate the remaining distance.

Further preferably, the remaining distance estimation means sets the sampling points for the section along the target trajectory from the current position to the end point such that a section closer to the current position has the sampling points spaced closer than a section farther from the current position.

Preferably, the target trajectory is defined in a form of a function including a parameter.

Preferably, the control apparatus further includes movement instruction means for outputting an instruction indicating an amount to be traveled by the movable unit within one control period so as to be the new target movement velocity value calculated by the movement velocity updating means, and the movement instruction means includes: means for calculating a distance to be traveled by the movable unit to correspond to the new target movement velocity value; means for calculating a position to be reached by the movable unit on the target trajectory to correspond to the distance to be traveled by the movable unit; and means for calculating a movement instruction for each of the drive shafts to correspond to the position to be reached by the movable unit.

Further preferably, the target trajectory is defined by Bézier curve.

Preferably, the target trajectory generation means generates the target trajectory in response to an externally received signal.

Preferably, the movement velocity updating means calculates the new target movement velocity value such that the acceleration and/or a jerk's variation do/does not exceed a predetermined limit.

A control system according to another aspect of the present invention includes: a movable mechanism having a movable unit movable by a plurality of drive shafts; a driver for driving the movable mechanism; and a control apparatus providing a control instruction to the driver. The control apparatus includes: target trajectory generation means for generating a target trajectory for a movement section defined by a start point and an end point; remaining distance estimation means for estimating a remaining distance along the target trajectory from a current position to the end point; acceleration calculation means for calculating an acceleration involved in varying a current movement velocity of the movable unit to a target velocity corresponding to a movement velocity to be satisfied by the movable unit at the end point of the target trajectory, such that a distance that the movable unit will have traveled substantially matches the remaining distance; and movement velocity updating means for calculating a new target movement velocity value by correcting the current movement velocity with the acceleration calculated.

According to still another aspect of the present invention, there is provided a method for controlling a device having a movable unit movable by a plurality of drive shafts. The control method includes the steps of: generating a target trajectory for a movement section defined by a start point and an end point; estimating a remaining distance along the target trajectory from a current position to the end point; calculating an acceleration involved in varying a current movement velocity of the movable unit to a target velocity corresponding to a movement velocity to be satisfied by the movable unit at the end point of the target trajectory, such that a distance that the movable unit will have traveled substantially matches the remaining distance; and calculating a new target movement velocity value by correcting the current movement velocity with the acceleration calculated.

Advantageous Effects of Invention

According to the present invention, a velocity at an end point of a target trajectory can be maintained at a target value even when the target trajectory is dynamically generated.

DESCRIPTION OF EMBODIMENTS

Figure 1:
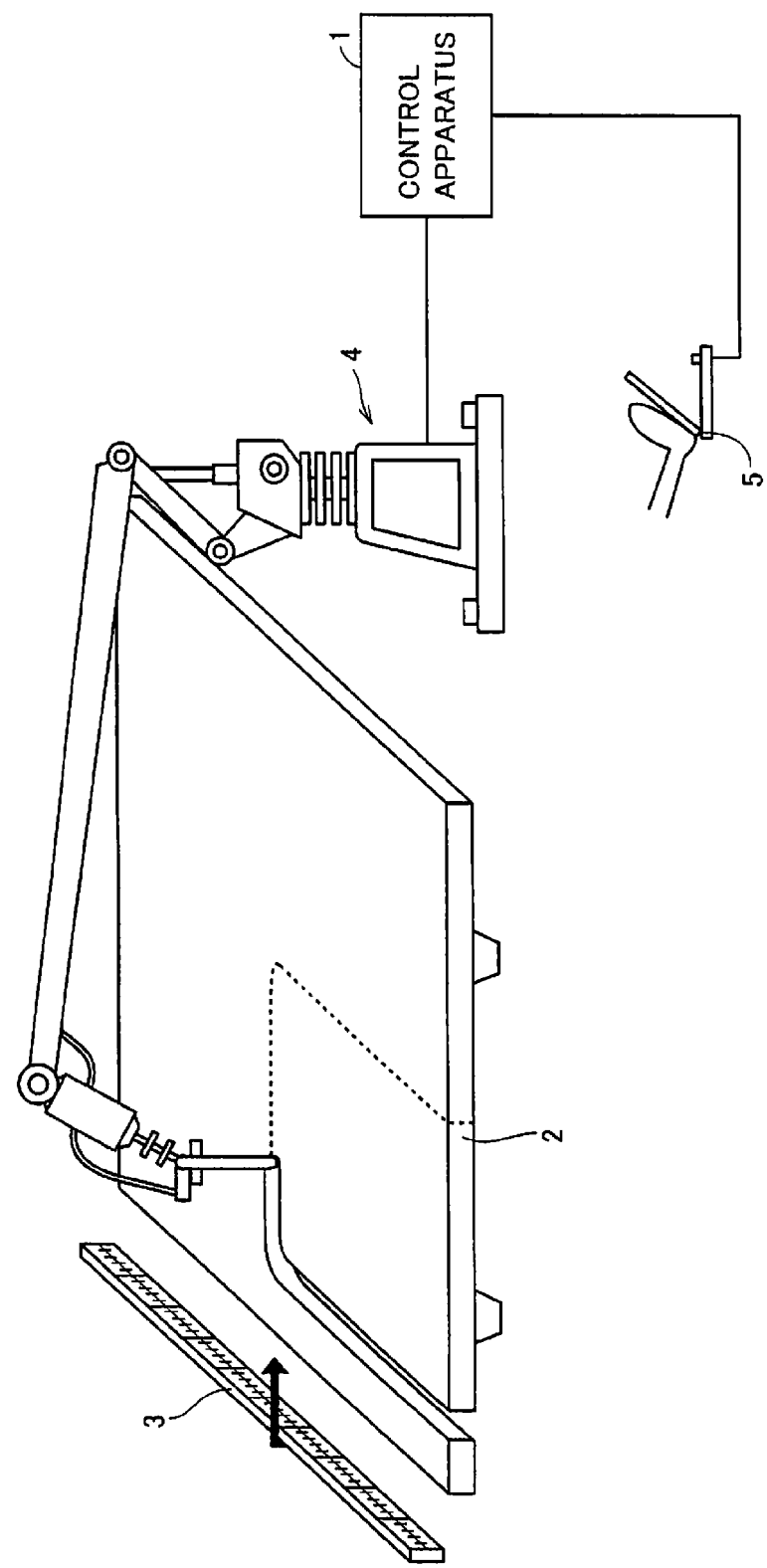
FIG. 1 is a schematic view showing an appearance of a system according to the present embodiment.

Embodiments of the present invention will be described in detail with reference to the drawings, in which the same or corresponding portions are indicated with the same reference characters and description thereof will not be repeated.

<A. System Configuration>

An overall configuration of a system SYS according to the present embodiment will be described first. In the following description, a production line for cutting and shaping a work will be described as an example of application of system SYS according to the present embodiment. A typical example of aforementioned cutting and shaping includes wood shaping, glass shaping, metal shaping or the like. As a matter of course, the present invention is not limited to the fields described in these embodiments, and is applicable to various industrial fields.

Figure 2:
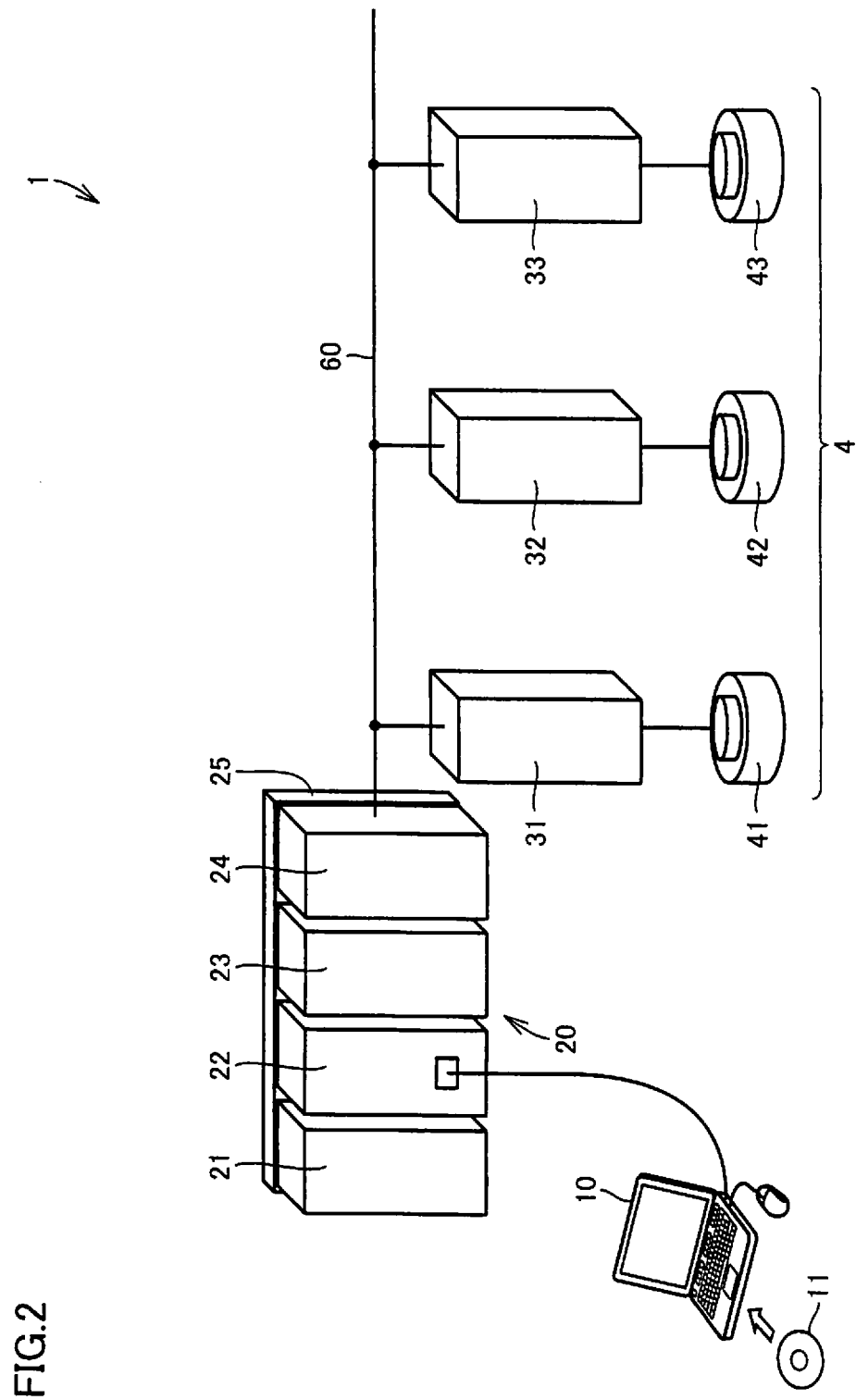
FIG. 2 is a schematic view showing an appearance of a control apparatus included in the system according to the present embodiment.
Figure 3:
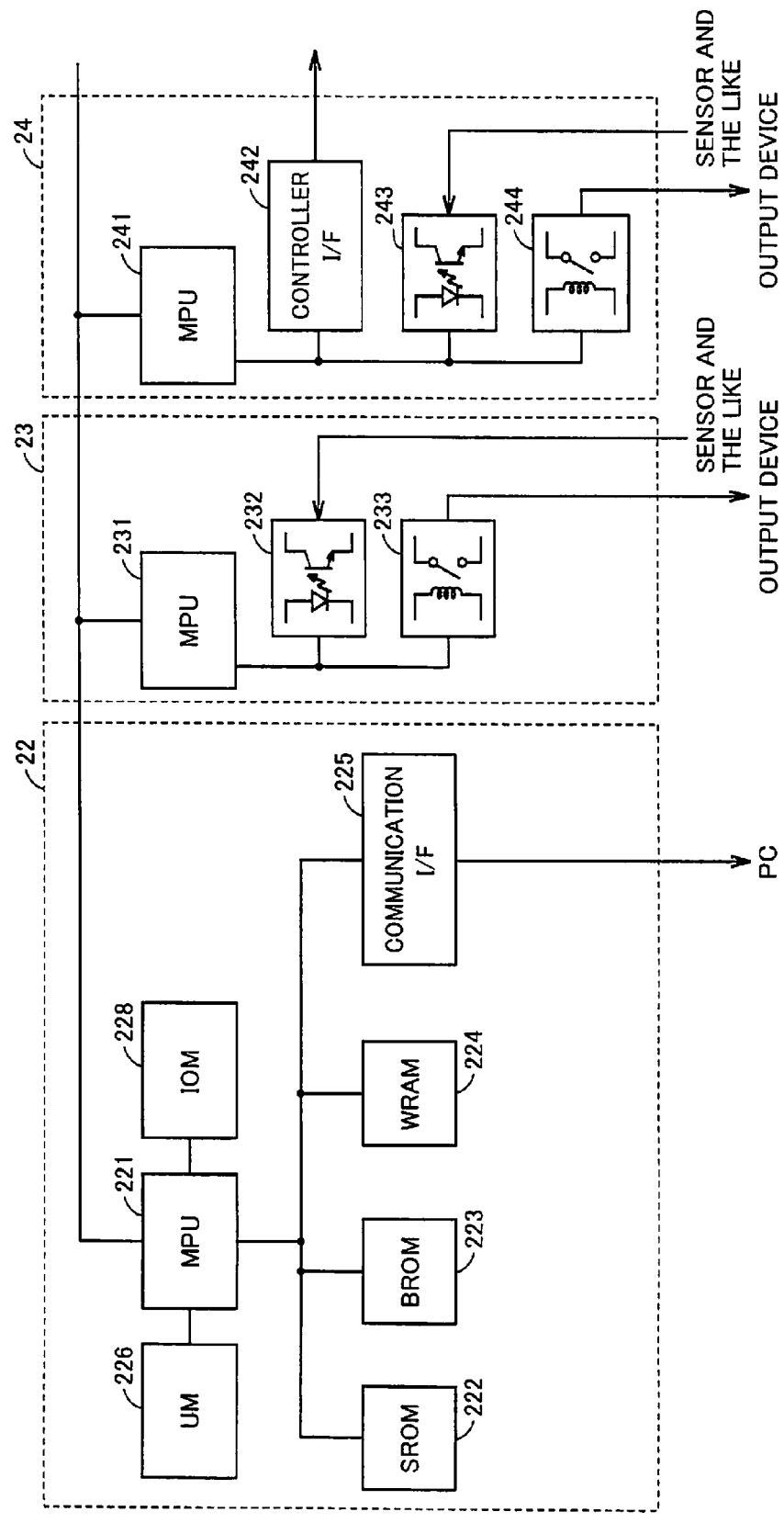
FIG. 3 is a schematic view showing a hardware configuration of the control apparatus included in the system according to the present embodiment.

FIG. 1 is a schematic view showing an appearance of system SYS according to the present embodiment. FIG. 2 is a schematic view showing an appearance of a control apparatus 1 included in system SYS according to the present embodiment. FIG. 3 is a schematic view showing a hardware configuration of control apparatus 1 included in system SYS according to the present embodiment.

Referring to FIG. 1, system SYS according to the present embodiment includes control apparatus 1, a measure 3 indicating a dimension and the like of a work 2 to be cut such as wood and metal, a robot (movable mechanism) 4 driven in accordance with an instruction from control apparatus 1, and a switch 5 outputting an event such as trajectory change in response to operation by an operator and the like. Control apparatus 1 will be described below in detail with reference to FIGS. 2 and 3.

Work 2 is put on a base, and is cut into a desired shape through the operation by the operator and the like. Typically, measure 3 is provided along this work 2, and when movable mechanism 4 performs cutting along a certain trajectory and reaches an intended position, the operator operates switch 5. As a result, the trajectory is changed in accordance with control logic described below.

Movable mechanism 4 is an apparatus having a movable unit (arm portion) movable by a plurality of drive shafts, and a tool (typically, an end mill) for cutting work 2 is mounted at a tip of this arm portion. As described below, this arm portion moves in accordance with the plurality of drive shafts (typically, three shafts or six shafts), to each of which a motor is mechanically coupled.

Control apparatus 1 controls a position of this end mill in accordance with the control logic described below, thereby shaping work 2 into a component having intended size and shape. The position of this end mill will also be referred to as "TCP (Tool Center Point)" hereinafter. A movement velocity of the arm portion (movement velocity of the end mill) of movable mechanism 4 will also be referred to as "TCP velocity".

Control apparatus 1 according to the present embodiment determines/changes a target trajectory dynamically in response to the operation and the like of switch 5 by the operator. For example, assuming that substantially rectangular components having different lengths depending on product type are fabricated from the same work 2, a portion where shaping starts (i.e., length of a straight portion) is different and details of shaping (i.e., curvature of a processed surface and the like) are the same in many cases. In such a case, using the same machining program (in which information such as the target trajectory on the processed surface is defined), the absolute target trajectory can be dynamically determined in accordance with the product type. This dynamic determination of the target trajectory is made by the operator checking a positional relationship between measure 3 (and an arrow provided on scales of measure 3) and movable mechanism 4, and operating switch 5.

Referring to FIG. 2, control apparatus 1 is typically configured based on a so-called PLC (Programmable Logic Controller). Specifically, control apparatus 1 includes a PLC 20 and motor drivers 31, 32 and 33.

PLC 20 is a main body of a process of executing the below-described control logic according to the present embodiment. The control logic is generally referred to as a motion program and is a program controlling a motor for driving movable mechanism 4. A sequence of this motion program may be described in the form of a sequence program, using a ladder diagram language. Furthermore, in addition to this sequence program, a program (function) for performing various arithmetic operations is executed.

More specifically, PLC 20 includes a power supply unit 21, a main processing unit 22, an IO (Input Output) unit 23, and an MC (Motion Control) unit 24. Power supply unit 21, main processing unit 22, IO unit 23, and MC unit 24 are electrically connected to one another by a back plane 25.

Power supply unit 21 generates DC electric power for driving the respective units, and DC electric power for IO. The electric power generated by this power supply unit 21 is distributed into the respective units via back plane 25.

Main processing unit 22 executes the sequence program.

IO unit 23 receives a detection signal from a sensor and the like placed at the apparatus to be controlled, and outputs a control instruction to an actuator, a display device and the like placed at the apparatus to be controlled.

In accordance with an instruction from main processing unit 22, MC unit 24 executes the motion program and outputs, to motor drivers 31, 32 and 33, a control instruction calculated as a result of execution of the motion program. MC unit 24 outputs a series of control instructions to motor drivers 31, 32 and 33 with the passage of time. MC unit 24 reports the execution conditions and execution result of the motion program to main processing unit 22.

Although FIG. 2 shows such a configuration that MC unit 24 is provided independently of main processing unit 22, main processing unit 22 can be equipped with the function of MC unit 24 and dedicated MC unit 24 can be omitted.

A hardware configuration of PLC 20 will be described with reference to FIG. 3. Main processing unit 22 includes a microprocessor (MPU: Micro-Processing Unit) 221, a system program memory (SROM: System-program Read Only Memory) 222, a buffer memory (BROM: Buffer Read Only Memory) 223, a work memory (WRAM: Working Random Access Memory) 224, a communication interface (communication I/F) 225, a user memory (UM: User Memory) 226, and an IO memory (1OM: Input Output Memory) 228.

Microprocessor (MPU) 221 controls the overall unit. More specifically, microprocessor 221 reads each command word constituting a user program from user memory 226 and executes the command word in order. System program memory (SROM) 222 stores the program executed by microprocessor 221. Buffer memory (BROM) 223 stores the user program. Work memory (WRAM) 224 is used as a work area when microprocessor 221 executes a system program. Communication interface 225 carries out data communication with a PC (personal computer) 10 as described below. User memory (UM: User Memory) 226 stores the user program transferred from buffer memory 223 at power-on. IO memory (IOM) 228 reflects and retains an input/output state of IO unit 23 and MC unit 24.

Instead of or in addition to the microprocessor (MPU), an application specific integrated circuit (ASIC) may be employed.

IO unit 23 includes a processing circuit (MPU) 231, an input circuit 232 and an output circuit 233. Input circuit 232 receives the detection signal from various sensors and the like provided at movable mechanism 4, and outputs a state value thereof to main processing unit 22. Typically, input circuit 232 is configured by a photocoupler circuit and the like. Output circuit 233 outputs the control instruction to the actuator, the display device and the like placed at the apparatus to be controlled and the like. Processing circuit 231 exchanges internal commands with input circuit 232 and output circuit 233.

MC unit 24 includes a processing circuit (MPU) 241, a controller interface (controller I/F) 242, an input circuit 243, and an output circuit 244. Controller interface 242 manages data transmission among motor drivers 31, 32 and 33 (see FIG. 2). Input circuit 243 and output circuit 244 are similar to input circuit 232 and output circuit 233, respectively. However, input circuit 243 and output circuit 244 mainly exchange information about motion control (motor drivers 31, 32 and 33 as well as motors 41, 42 and 43).

Referring to FIG. 2 again, motor drivers 31, 32 and 33 receive the control instruction from MC unit 24, and drive corresponding motors 41, 42 and 43. In other words, motor drivers 31, 32 and 33 supply drive power to motors 41, 42 and 43.

Motors 41, 42 and 43 are components of movable mechanism 4 (see FIG. 1). These motors are rotationally driven, thereby moving the arm portion of movable mechanism 4. A servomotor, a stepping motor or the like is employed as motors 41, 42 and 43. In this case, a motor driver corresponding to the type of the employed motor is used.

FIG. 2 shows an example of such a configuration that motor drivers 31, 32 and 33 are connected to MC unit 24 by a communication line 60 such as EtherCAT (registered trademark). Motor drivers 31, 32 and 33 may, however, be connected directly to MC unit 24.

The control instruction provided from MC unit 24 to motor drivers 31, 32 and 33 is a value of a position, a velocity, torque and the like of the motors. In the present embodiment, a position instruction (target position) is provided from MC unit 24 to each of motor drivers 31, 32 and 33 at a fixed period. This target position may be rotational positions (rotational angles) of motors 41, 42 and 43, or may be a position of a particular portion of movable mechanism 4 driven by motors 41, 42 and 43. In other words, it is a matter of based on what coordinate the target position is determined, and an appropriate criterion is employed depending on the situation.

In the present embodiment, so-called "accumulated error pulse" is used as the target position. In other words, the target position is expressed as "the number of pulses transmitted within a control period". In this case, the number of pulses indicates a position relative to a position in the immediately preceding control period (an amount of deviation/a variation in position).

Motor drivers 31, 32 and 33 has setting information (e.g., a coefficient for converting the position instruction into a current value, and the like) required to interpret the position instruction (target position) and drive motors 41, 42 and 43. For example, information of the number of pulses corresponding to one rotation of motors 41, 42 and 43 is preset in motor drivers 31, 32 and 33.

Motor drivers 31, 32 and 33 receive feedback about a current position (measured value) from encoders provided at motors 41, 42 and 43 and detecting the rotational positions of the servomotors. Using the measured value and a measured velocity calculated as a measured value change, motor drivers 31, 32 and 33 control magnitude of the drive power such that the measured value follows an instruction value (feedback control).

Similarly to motor drivers 31, 32 and 33, information of the number of pulses corresponding to one rotation of motors 41, 42 and 43 is preset in MC unit 24, and information of an amount of movement about the position of the particular portion of movable mechanism 4 corresponding to one rotation of motors 41, 42 and 43 is also preset in MC unit 24. Using these set values, MC unit 24 calculates the number of pulses required to implement the movement of the apparatus to be controlled that is programmed for each control period, and transmits the number of pulses to motor drivers 31, 32 and 33.

On the other hand, PC 10 is configured based on a general-purpose computer, and is connected to main processing unit 22 by a communication line such as an USB (Universal Serial Bus). A program for implementing the control logic according to the present embodiment is transferred from PC 10 to main processing unit 22, and the operating conditions, a log and the like of PLC 20 can be checked on a display of PC 10. The configuration of PC 10 is known, and thus, detailed description will not be repeated here.

Although FIG. 2 illustrates PLC-based control apparatus 1, control apparatus 1 is not limited to this configuration. For example, control apparatus 1 may be configured by a combination of a general-purpose computer-based processing device and an input/output device exchanging a signal with motor drivers 31, 32 and 33, the sensor and the like.

When such a configuration is employed, a general-purpose module provided by the OS (Operating System) may be used to implement the control logic according to the present embodiment. In other words, as a program for providing the control logic according to the present embodiment, there is a form of a program that does not have a part of common functions, which is also included in the scope of the present invention clearly.

Furthermore, the function provided by control apparatus 1 may be implemented by a combination of software and a dedicated hardware circuit.

<B. Overview>

In the control logic according to the embodiment of the present invention, a current velocity is increased and decreased at an acceleration having as small fluctuations as possible, such that the TCP velocity at the end point of the preset target trajectory matches a final target velocity. In other words, the TCP velocity changes smoothly toward the final target velocity, and continuity with a target velocity in a subsequent trajectory can also be maintained. As a result, uniformity of a finished surface is enhanced.

As for a target acceleration for changing the current velocity to the final target velocity, a remaining distance on the target trajectory of interest from the current position to the end point is estimated and an optimum value is calculated based on the estimated remaining distance in each control period. Since the target acceleration is sequentially calculated in each control period in consideration of the end point of the target trajectory as described above, sharp increase/decrease in velocity and acceleration at the end point of the target trajectory can be eliminated.

In the control logic according to the present embodiment, the current velocity and the target velocity are calculated based on a linearly-interpolated or polynomially-interpolated velocity trajectory. Particularly, since the number of sampling for dividing a section is fixed regardless of the remaining distance, the calculation time is determined and this configuration is more suitable for the on-line calculation scheme. As a result, even when a free function such as Bézier curve is used as the target trajectory, completion of the processing time in the aforementioned estimation of the remaining distance within one control period can be ensured.

In the control logic according to the present embodiment, each of the acceleration and a jerk's variation involved in changing the TCP velocity is limited so as not to exceed a predetermined limit value. Therefore, occurrence of "chatter" and excessive torque in movable mechanism 4 can be suppressed.

<C. Overall Process Procedure>

Next, an overview of the control logic according to the present embodiment will be described.

Figure 4:
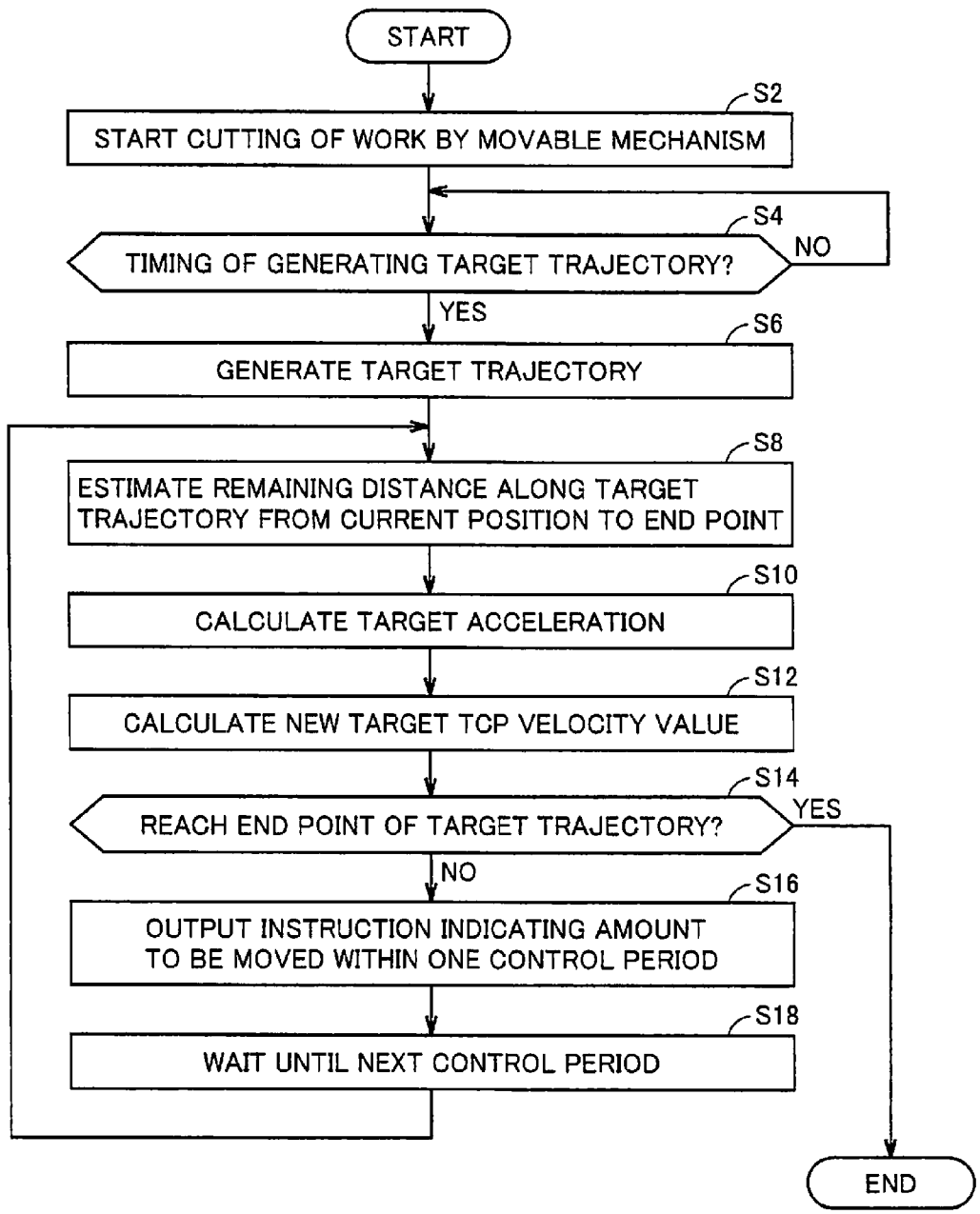
FIG. 4 is a flowchart showing an overview of a process procedure of control logic according to the present embodiment.

FIG. 4 is a flowchart showing the overview of a process procedure of the control logic according to the present embodiment. Although each step shown in FIG. 4 is executed by control apparatus 1, a main body executing each step varies depending on a form of mounting. In other words, main processing unit 22 (see FIG. 2) may execute all processes, or main processing unit 22 and MC unit 24 (see FIG. 2) may execute the processes in collaboration.

Referring to FIG. 4, control at system SYS starts first. At this time, cutting of work 2 by movable mechanism 4 starts (see FIG. 1) (step S2). Next, it is determined whether or not the timing of generating a target trajectory has come (step S4). In other words, when movable mechanism 4 reaches a predetermined position of work 2, the target trajectory corresponding to this position is generated, and it is determined whether or not this target trajectory should be generated. More specifically, it is determined whether or not a signal (detection signal) is externally received from switch 5 shown in FIG. 1. If the timing of generating the target trajectory does not come (NO in step S4), the process in step S4 is repeated.

On the other hand, if the timing of generating the target trajectory has come (YES in step S4), the target trajectory is generated for a movement section defined by a start point and an end point (step S6). In other words, the target trajectory is generated in response to the externally received signal. It is to be noted that the start point and the end point are determined based on preset information. In other words, the start point and the end point may be set in association with the actual position of work 2, or may be set independently of the actual position of work 2. Then, a process for moving movable mechanism 4 along the target trajectory as described below starts.

First, a remaining distance along the target trajectory from a current position to the end point is estimated (step S8). In other words, a current value of the TCP (information indicating the current position) of movable mechanism 4 is obtained, and the distance to the end point of the target trajectory is estimated using (a function indicating) the determined target trajectory.

Next, a target acceleration is calculated such that a distance that the movable unit of movable mechanism 4 will have traveled substantially matches the remaining distance estimated in step S8, when a current TCP velocity of movable mechanism 4 (movement velocity of the movable unit) is changed to a final target velocity corresponding to a movement velocity to be satisfied by the movable unit of movable mechanism 4 at the end point of the target trajectory (step S10). Furthermore, a new target TCP velocity value is calculated by correcting the current TCP velocity with the target acceleration calculated in step S10 (step S12).

Now, it is determined whether or not the TCP has reached the end point of the set target trajectory (step S14). In other words, it is determined whether or not motion control along the target trajectory has been finished. If the TCP has reached the end point of the set target trajectory (YES in step S14), motion control based on this time's target trajectory is finished. When the control logic is programmed such that a plurality of target trajectories are set for the same work 2, the processes in step S2 and the subsequent steps are executed again.

On the other hand, if the TCP does not reach the end point of the set target trajectory (NO in step S14), an instruction indicating an amount to be traveled by the movable unit of movable mechanism 4 within one control period is outputted so as to be the new target TCP velocity value calculated in step S12 (step S16). In other words, the predetermined number of pulses (accumulated error pulses) are provided to motor drivers 31, 32 and 33 such that the TCP is in a position corresponding to the new target value at the start timing of the next control period. Then, the process waits until the next control period (step S18), and the processes in step S8 and the subsequent steps are repeated.

The main steps shown in FIG. 4 will be described in detail hereinafter.

<D. Generation of Target Trajectory (step S6)>
(d1: Problems and the Like in Conventional Art)

Before describing the process of generating the target trajectory according to the present embodiment, problems and the like in the conventional art will be described first.

Figure 5:
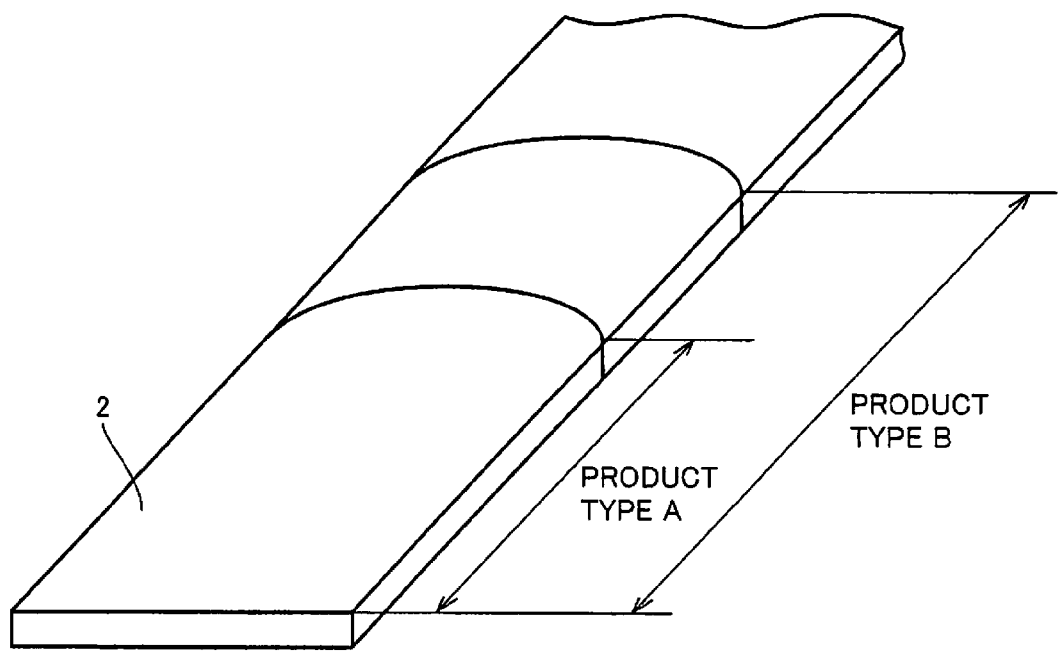
FIG. 5 shows one example of a process of cutting and shaping a work.

FIG. 5 shows one example of the process of cutting and shaping work 2. As shown in FIG. 5, assume, for example, that products of a plurality of types (product type A and product type B) are fabricated, each of which has one side cut to have a similar shape. Product type A and product type B shown in FIG. 5 are the same in terms of the shape of cutting, while product type A and product type B are different in terms of a position where cutting starts. In this case, since work 2 is conveyed in the longitudinal direction, product type A and product type B can be fabricated simply by making this start timing of cutting different. In this case, focusing on portions to be cut, cutting along the same trajectory can be applied.

In the aforementioned application, there is a demand for preparing a common machining program without creating a shaping drawing and a machining program for each product type, and detecting a relative positional relationship between work 2 and the robot, and setting the target trajectory dynamically (i.e., on line). Shared use of the machining program as described above allows reduction in production cost.

First, when the aforementioned on-line calculation scheme is used, the process of generating a new target trajectory must be completed within the control period (sampling interval), and the target trajectory used until then must be changed. In other words, completion of setting the new target trajectory within one control period is ensured. Therefore, it is not practical to employ, as the target trajectory, a complicated target trajectory or a target trajectory in which an amount of processing changes dependently on the shape of an object to be cut.

Thus, a method using arc interpolation has been present as one conventional approach.

Figure 6:
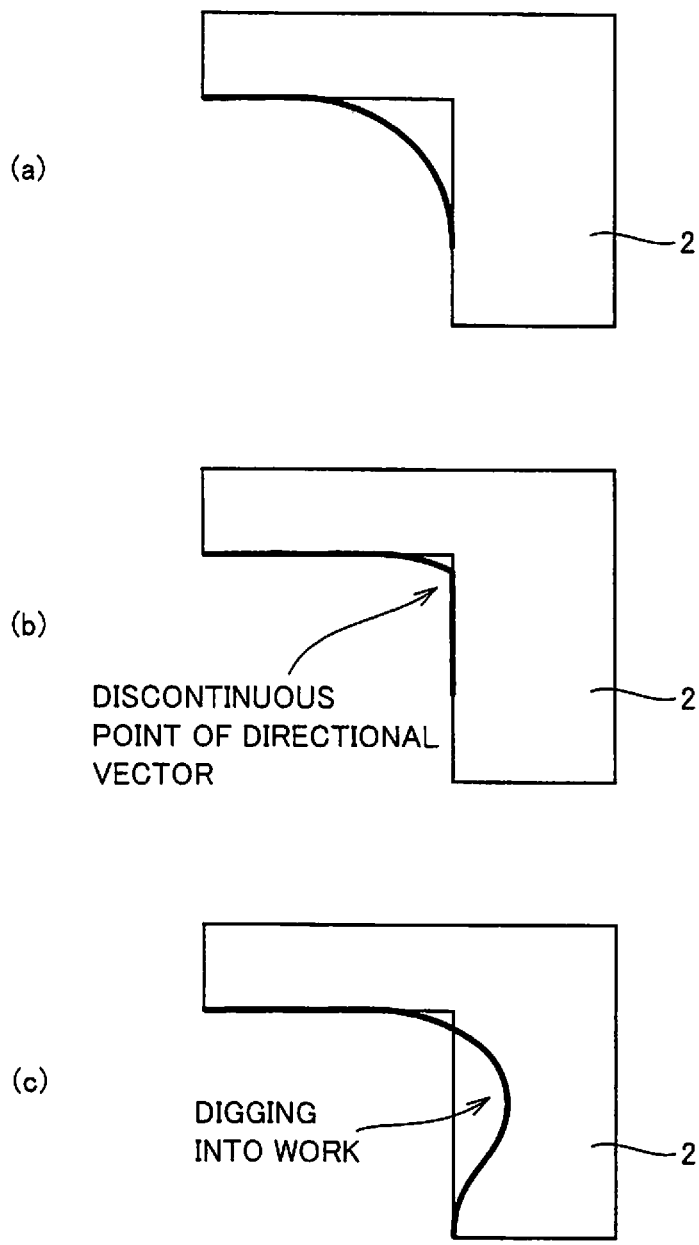
FIG. 6 shows an example of a process of generating a target trajectory using arc interpolation when the work is cut into an L shape.

FIG. 6 shows an example of the process of generating the target trajectory using arc interpolation when work 2 is cut into an L shape.

FIG. 6(a) shows an example in which arc interpolation is appropriately set. On the other hand, FIGS. 6(b) and (c) show examples in which arc interpolation is inappropriately set.

FIG. 6(b) shows an example in which a curvature is inappropriately set to maintain the shape of cut work 2, and as a result, a directional vector on the trajectory is discontinuous. FIG. 6(c) shows an example in which a directional vector is forcibly made continuous by using an arc having a certain curvature to maintain continuity of the directional vector on the trajectory, and as a result, the intended shape of cutting cannot be achieved and digging into a processed surface of work 2 occurs.

In addition, there is a demand for making continuous a velocity vector at the start point and a velocity vector at the end point. The reason for this is that if the velocity vector is discontinuous, a joint portion of surfaces becomes manifest or an amount of cutting changes, which leads to deterioration of the finish (appearance) quality after shaping. However, when arc interpolation is used, there is also an essential problem that the velocity vector on the trajectory becomes discontinuous when the start point vector and the end point vector are not in the same plane.

In addition, although a curvature of a curve for chamfering must be designed in arc interpolation, it is difficult in terms of cost and time to perform this task on all corners included in a target shape. Therefore, there is a demand for presetting only a rough curvature radius of the arc, and automating redesign of the target trajectory for a corner that cannot be dealt with by this preset curvature radius. Conventional arc interpolation could not, however, respond to such a demand.

A method using a free curve has been present as another conventional approach.

Figure 7:
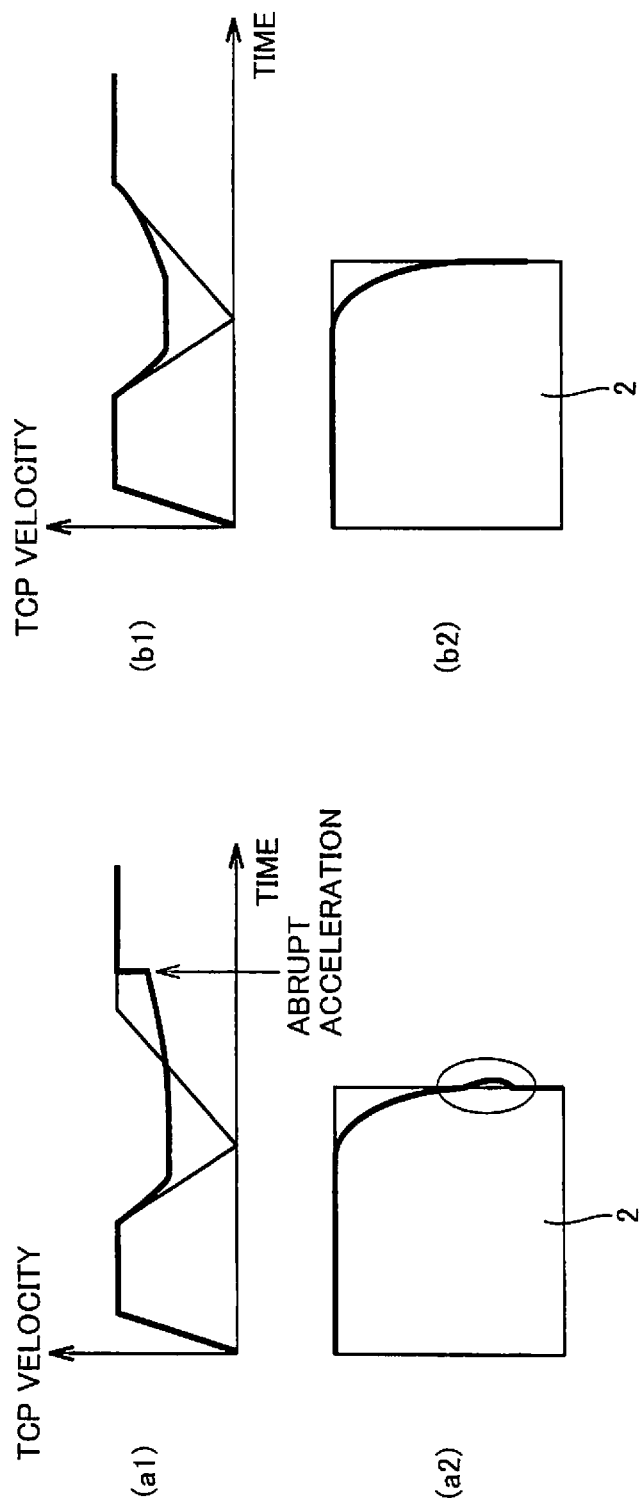
FIG. 7 shows an example of a process of generating a target trajectory using a free curve when a corner of the work is cut.

FIG. 7 shows an example of the process of generating the target trajectory using the free curve when a corner of work 2 is cut. FIG. 7(a1) shows an example of the TCP velocity of movable mechanism 4 moving along the target trajectory generated in accordance with the conventional art. FIG. 7(a2) shows an example of the target trajectory generated in accordance with the conventional art.

As shown in FIG. 7(a1), if the velocity vector at the end point is discontinuous, an amount of cutting an end face changes sharply, which leads to unevenness of the finish (appearance). In other words, movable mechanism 4 accelerates abruptly at the end point, and roughness and a bulge may occur on the cut surface. As a result, in addition to impairment of the appearance, functional problems such as formation of a gap occur. In addition, as a result of abrupt acceleration of movable mechanism 4, the directional vector becomes discontinuous, and thus, a discontinuous line is generated on the cut surface.

FIG. 7(b1) shows an example of the TCP velocity of movable mechanism 4 controlled by the control logic according to the present embodiment. FIG. 7(b2) shows an example of the target trajectory generated by the control logic according to the present embodiment.

In the present embodiment, as shown in FIG. 7(b1), the TCP velocity at the end point of the target trajectory is controlled to match the predetermined final target velocity in order to keep continuity with the subsequent trajectory velocity. At the same time, as shown in FIG. 7(b1), the TCP velocity at the end point of the target trajectory is controlled to keep continuity of the velocity vector on the target trajectory. As a result, the desired target trajectory can be generated as shown in FIG. 7(b2).

In the control logic according to the present embodiment, the target trajectory is generated mainly using the free curve.

However, the TCP velocity on the target trajectory can be matched with the target velocity in the aforementioned arc interpolation, while the TCP velocity (particularly, the velocity at the end point) on the target trajectory cannot be matched with the target velocity in interpolation using the other free curves. In addition, as a problem when the target trajectory is generated using the free curve, there is a possibility that completion of the operation processing within a control period is not ensured. In other words, in order to maintain, at a target value, the velocity vector at the end point of the target trajectory, the remaining distance (remaining trajectory length) must be calculated on line. However, the trajectory length of the target trajectory cannot be expressed by an elementary function in the free curve, (except for arc interpolation), and thus, it is difficult to calculate the trajectory length of the target trajectory in a short time. The remaining distance can also be calculated using numerical integration. However, if the integration processing is performed while changing the number of division in accordance with the curvature in order to calculate the accurate remaining distance, completion of the process of calculating the remaining distance within one control period cannot be ensured.

(d2: Method in the Present Embodiment)

In view of the aforementioned problems, in the control logic according to the present embodiment, the target trajectory is set using the free curve in order to maintain continuity of the directional vectors at the start point and the end point of the target trajectory. This target trajectory is defined in the form of a function including a parameter.

Specifically, interpolation curves such as Bézier curve, β spline curve, NURBUS, Hermitian curve, Catmull-Rom spline curve, and Ferguson/Coons curve can be used. In the following control logic, the case where "Bézier curve" is employed among these interpolation curves will be described by way of example.

By employing this interpolation curve (Bézier curve), digging into the work on the target trajectory as shown in FIG. 6(c) can be prevented.

Figure 8:
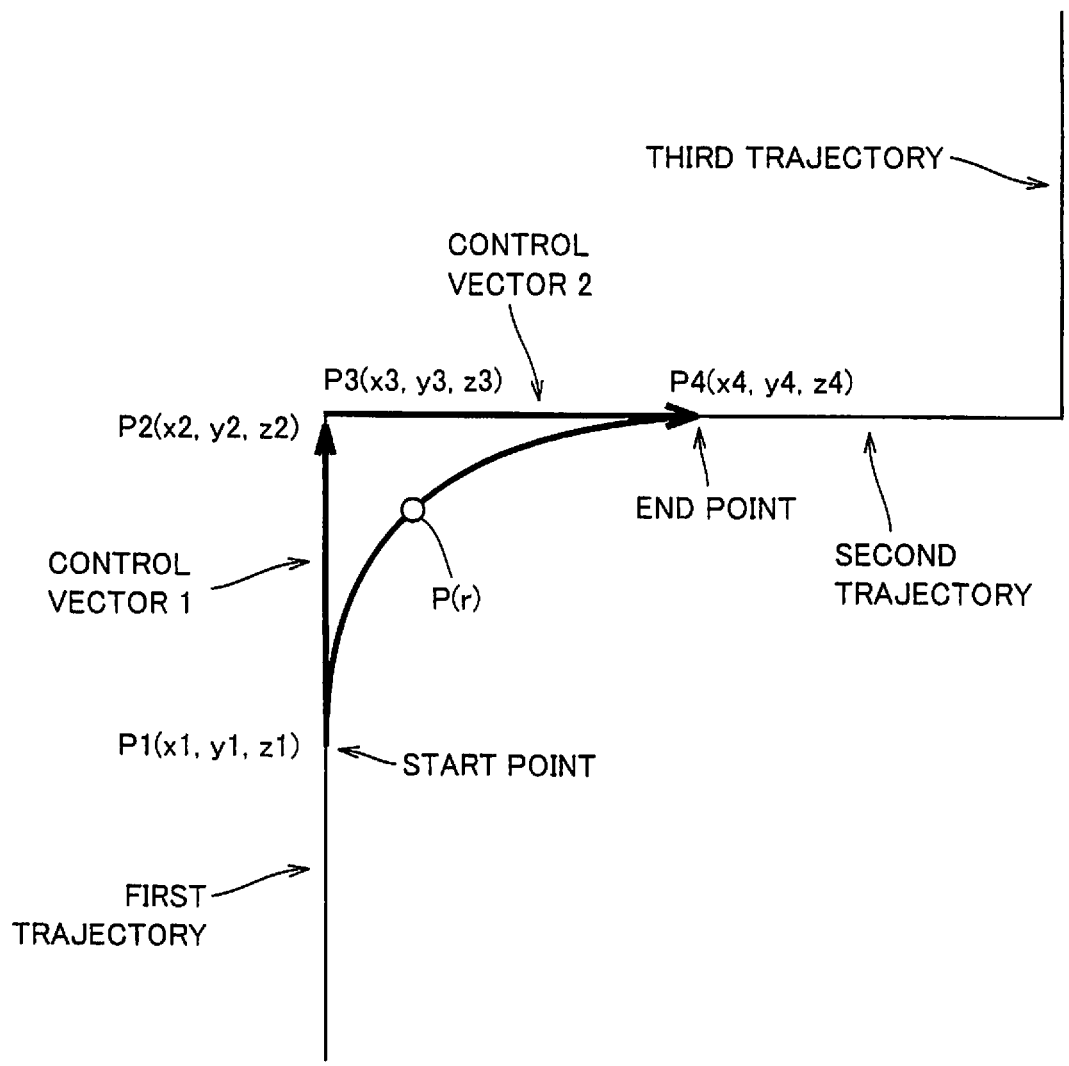
FIG. 8 is a diagram for describing a method for generating the target trajectory (Bézier curve) according to the present embodiment.

FIG. 8 is a diagram for describing a method for generating the target trajectory (Bézier curve) according to the present embodiment. Referring to FIG. 8, when the target trajectory is generated using the Bézier curve, at least a movement section including a start point and an end point must be defined.

At this time, a first trajectory serving as a criterion for setting the target trajectory, and a second trajectory that is a trajectory connecting to the first trajectory are defined. The start point of the target trajectory is located on the first trajectory and the end point of the target trajectory is located on the second trajectory.

Although the first and second trajectories can be arbitrarily set, the processed surface of the work is defined as the first and second trajectories in system SYS shown in FIG. 1. A start point P1(x1, x2, x3) may be determined by switch 5 (see FIG. 1) and the like in response to arrival of work 2 at a predetermined position. Two control vectors are required to set the Bézier curve. Therefore, when start point P1 is determined, control points P2 and P3 are determined, and control vectors 1 and 2 are also determined in accordance with these points.

In an example of application to cutting as shown in FIG. 1, control points P2(x2, y2, z2) and P3(x3, y3, z3) are generally preset. Therefore, when start point P1 is determined, control vector 1 is determined as a line segment connecting this start point P1 and control point P2. In addition, in accordance with a positional relationship between start point P1 and control point P2, and the like, an end point P4(x4, y4, z4) is determined. Then, control vector 2 is determined as a line segment connecting control point P3 and end point P4.

By determining control vectors 1 and 2 as described above, the Bézier curve, i.e., the target trajectory is determined.

More specifically, using a parameter r (0≤r≤1), a target position P(r) on the target trajectory can be expressed as follows. Target position P(r) is generally defined as a value on a three-dimensional coordinate.

$$P(r)=(1-r)^3 \times P1 + 3(1-r)^2 \times r \times P2 + 3(1-r) \times r^2 \times P3 + r^3 \times P4$$

When an interpolation curve other than the Bézier curve is used, the control vectors may be set at positions independent of the first and second trajectories. In addition, the first trajectory does not always have to be orthogonal to the second trajectory.

Furthermore, start point P1, control points P2 and P3, and end point P4 can also be arbitrarily set. In other words, these points may be set in accordance with detection by the sensor, or a fixed value may be preset.

By setting the target trajectory using the Bézier curve as described above, the target trajectory is generated between the two control vectors as shown in FIG. 8. Therefore, this method is suitable for generation of the target trajectory in an application such as wood shaping where digging into a processed surface is not permitted. In addition, the start point and the end point of the target trajectory match the start point and the end point of the control vectors, and thus, the control vectors can be readily generated.

<E. Estimation of Remaining Distance (Step S8)>

Next, description will be given to the process of estimating the remaining distance along the target trajectory from the current position to the end point, which serves as a criterion for calculating the target acceleration.

As described below, the Bézier curve is a high-order function defined by the parameter, and a relationship between the parameter and the trajectory length cannot be expressed by the elementary function. Therefore, numerical integration must be used to precisely calculate the remaining distance from a certain position (current position) to the end point on the target trajectory. On the other hand, when many points of division for numerical integration are set, the operation processing may increase and completion of the calculation process within one control period may be impossible.

Thus, in the control logic according to the present embodiment, the remaining distance is estimated by setting the predetermined certain number of sampling points for the section along the target trajectory from the current position to the end point, and linearly interpolating or polynomially interpolating the set sampling points.

Figure 9:
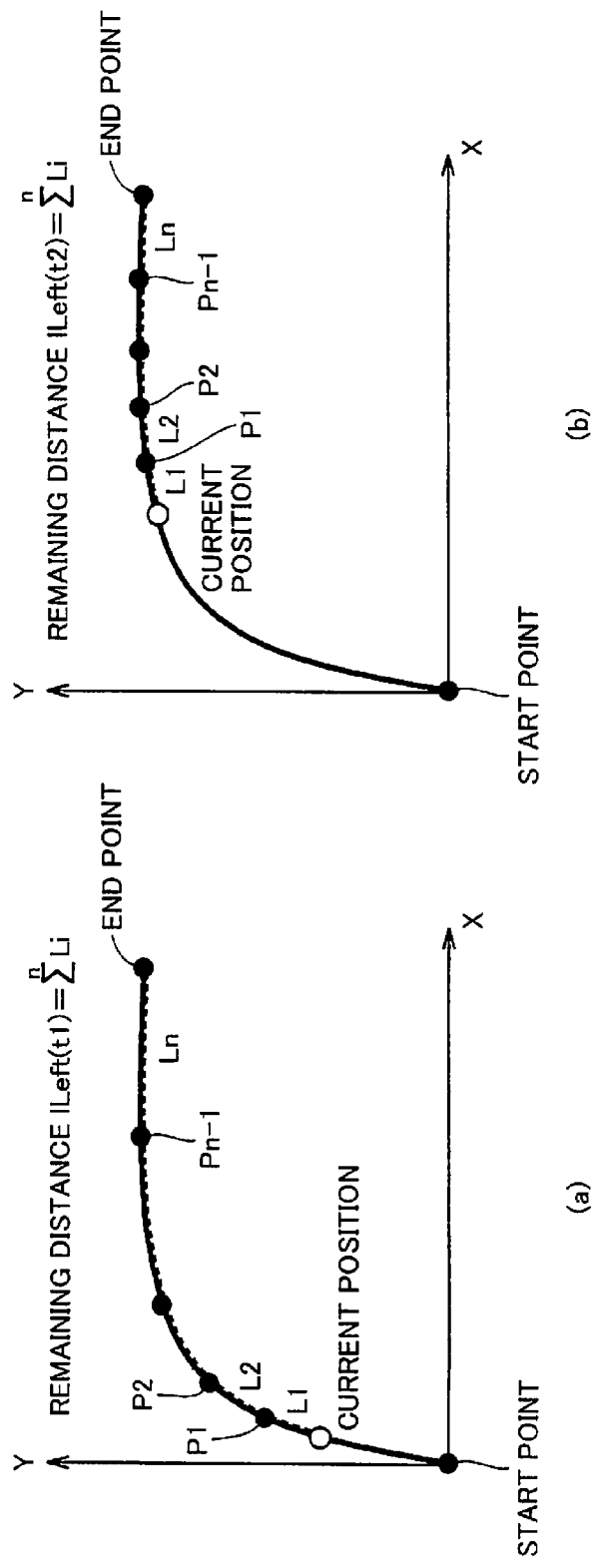
FIG. 9 is a diagram for describing a method for estimating a remaining distance according to the present embodiment.

FIG. 9 is a diagram for describing a method for estimating the remaining distance according to the present embodiment. FIG. 9(a) shows the case where the current position is close to the start point of the target trajectory (time t1). FIG. 9(b) shows the case where the current position is close to the end point of the target trajectory (time t2).

As shown in FIGS. 9(a) and (b), a remaining distance lLeft(t) is calculated as a total ΣLi of distances L1, L2, . . . , and Ln between adjacent sampling points P1, P2, . . . , and Pn-1. The number of the set sampling points may be determined dependently on the processing capability of control apparatus 1, and the like, and four to six sampling points are preferably set, for example.

As can be seen from comparison between FIGS. 9(a) and (b), whether the current position on the target trajectory is close to the start point or close to the end point, the certain number of sampling points are set on the target trajectory. Therefore, when the current position on the target trajectory is close to the start point, the distance between the sampling points becomes relatively longer and the estimation accuracy decreases. On the other hand, when the current position on the target trajectory is close to the end point, the distance between the sampling points becomes relatively shorter and the estimation accuracy improves. In other words, an error in estimating the remaining distance becomes larger as the curvature of the target trajectory becomes larger, and the error is eliminated as the end point approaches.

As described below, this estimated remaining distance lLeft(t) determines the target acceleration (i.e., a TCP velocity change on the target trajectory), and the accuracy of the calculated target acceleration becomes higher as the current position on the target trajectory comes closer to the end point. As a result, as the end point approaches, the TCP velocity matches the final target velocity at the end point.

As shown in FIGS. 9(a) and (b), the sampling points are preferably set for the section along the target trajectory from the current position to the end point such that a section closer to the current position has the sampling points spaced closer than a section farther from the current position.

As described above, the start point of the target trajectory corresponds to parameter r=0 and the end point of the target trajectory corresponds to parameter r=1. In other words, by increasing parameter r from 0 to 1, the current position on the target trajectory is moved from the start point to the end point. Thus, a difference between a value of parameter r indicating each current position and parameter r=1 corresponding to the end point of the target trajectory is calculated and each point is set at a position where a relative ratio of the difference attains a predetermined value.

For example, when four sampling points are set between the current position and the end point, the sampling points are considered to be set at positions of parameter r corresponding to 2/12, 4/12, 6/12, and 9/12 with respect to the difference of parameter r. Specifically, when the current position is located at a position corresponding to parameter r="0.4", the sampling points are set at the aforementioned ratio to "0.6" that is a difference from parameter at the end point r="1.0". In this case, the sampling points are set at positions corresponding to parameter r="0.5", "0.6", "0.7", and "0.85".

As an alternative method, the sampling points may be set in consideration of a point where the curvature of the target trajectory is maximum. In other words, parameter r where the curvature of the target trajectory is maximum is calculated in accordance with the following equation:

$$r=[\sqrt{\{(P1-P2) \times P4+P3^2+(-P2-P1) \times P3+P2^2\}-P3+2 \times P2-P1}]/(P4-3 \times P3+3 \times P2-P1)$$

Therefore, the predetermined number of sampling points may be set, using, as a criterion, this position of parameter r where the curvature is maximum.

<F. Calculation of Target Acceleration (step S10)>

Next, description will be given to the process of calculating the target acceleration during movement on the target trajectory.

In the control logic according to the present embodiment, the target value of the TCP velocity at the end point of the target trajectory is provided. Therefore, the target acceleration is calculated such that a velocity change (acceleration) from each current position to the target value of the TCP velocity is linear.

Figure 10:
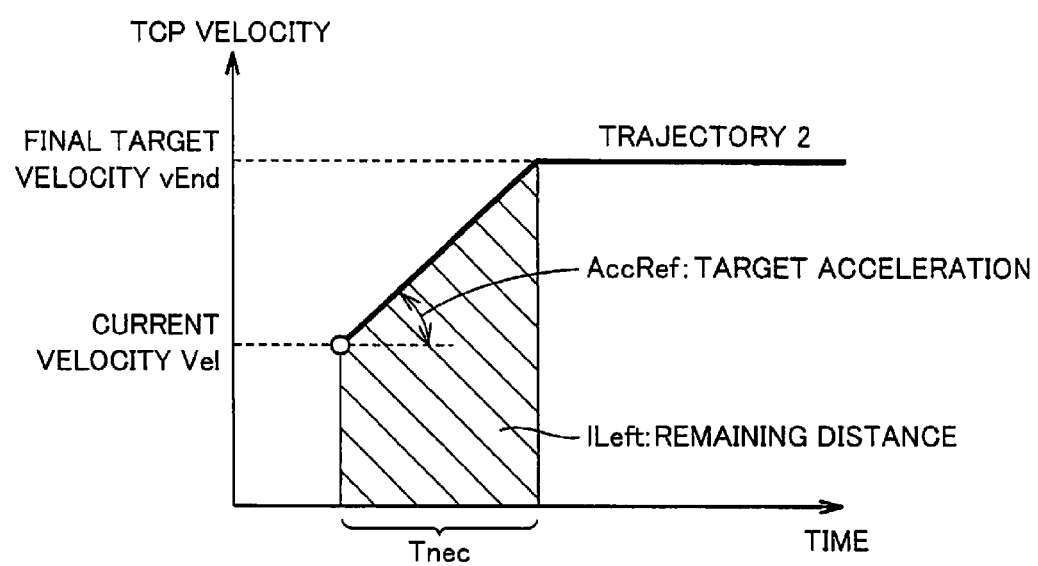
FIG. 10 is a diagram for describing a method for calculating a target acceleration according to the present embodiment.

FIG. 10 is a diagram for describing a method for calculating the target acceleration according to the present embodiment. Referring to FIG. 10, assuming that a current velocity Vel represents the TCP velocity on the target trajectory at a certain time point and a final target velocity vEnd represents the target value of the TCP velocity at the end point of the target trajectory, a target acceleration AccRef represents an acceleration linearly connecting current velocity Vel and final target velocity vEnd in a time-TCP velocity coordinate. In other words, target acceleration AccRef is calculated in each control period to vary current velocity Vel to final target velocity vEnd at a fixed rate. In other words, target acceleration AccRef is calculated in accordance with the following equation:

$$AccRef=(vEnd-Vel)/Tnec$$

Time Tnec herein represents a time required for movement by estimated remaining distance lLeft and is calculated in accordance with the following equation:

$$Tnec=2 \times lLeft/(Vel+vEnd)$$

Therefore, combining these two equations, target acceleration AccRef is calculated in accordance with the following equation:

$$AccRef=(vEnd^2-Vel^2)/(2 \times lLeft)$$

In other words, target acceleration AccRef is calculated based on current velocity Vel, final target velocity vEnd and estimated remaining distance lLeft.

<G. Calculation of New Target TCP Velocity Value (step S12)>

Next, description will be given to the process of calculating the updated target TCP velocity value (target velocity) in each control period.

In other words, the target TCP velocity value (target velocity VelRef) in the next control period is calculated by correcting the current TCP velocity (current velocity Vel) with target acceleration AccRef calculated in each control period. In other words, target velocity VelRef is calculated in accordance with the following equation:

$$VelRef=Vel+AccRef$$

<H. Output of Movement Instruction (Step S16)>

Next, description will be given to the process of outputting the instruction indicating the amount to be traveled, which is required to achieve target velocity VelRef. Target velocity VelRef herein corresponds to a variation ΔL in trajectory length of the arm portion of movable mechanism 4 within one control period (=movement distance/control period).

Figure 11:
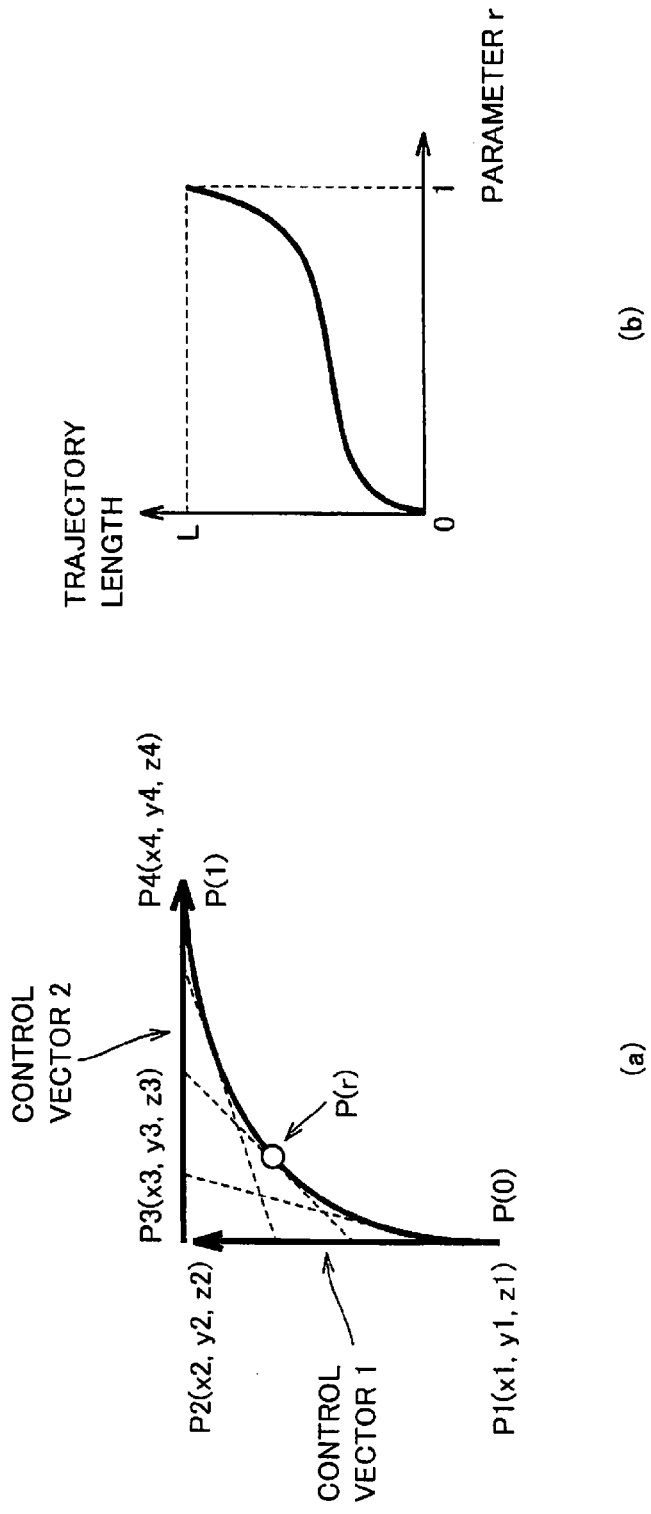
FIG. 11 shows the Bézier curve and a property of a trajectory length thereof according to the present embodiment.

FIG. 11 shows the Bézier curve and a property of the trajectory length thereof according to the present embodiment. When the Bézier curve shown in FIG. 11(a) is set as the target trajectory, a position on the target trajectory is defined by parameter r. On the other hand, as shown in FIG. 11(b), a trajectory length L of the target trajectory has a nonlinear relationship with parameter r.

Figure 12:
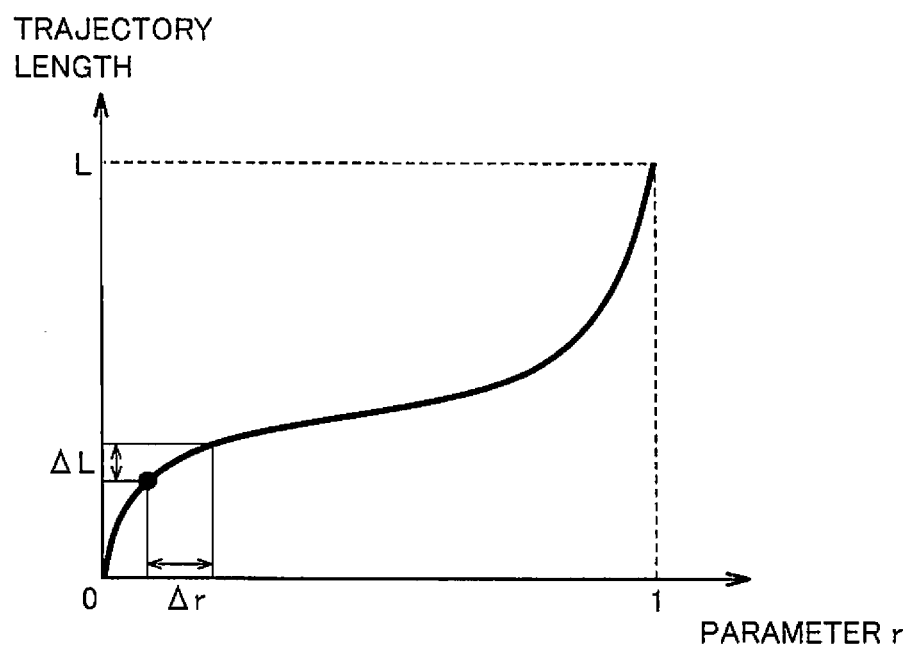
FIG. 12 shows a relationship between an amount of displacement of a parameter and an amount of displacement of the trajectory length in the Bézier curve.

FIG. 12 shows a relationship between an amount of displacement of parameter r and an amount of displacement of trajectory length L in the Bézier curve. As shown in FIG. 12, a parameter increment Δr when the arm portion of movable mechanism 4 is moved by variation ΔL along the target trajectory in a certain control period changes dependently on a value of r. In other words, since the relationship between parameter r and trajectory length L is nonlinear, the TCP velocity (current velocity Vel) is not set to a fixed value even if parameter increment Δr is set to a fixed value.

Therefore, even if variation ΔL until the next control period is calculated in each control period, the following cannot be calculated by simple calculation: to which position on the target trajectory the arm portion of movable mechanism 4 must be moved.

Thus, in the control logic according to the present embodiment, the movement velocity on the target trajectory is controlled by sequentially calculating parameter increment Δr dependently on the value of parameter r. More specifically, as described in detail below, the nonlinear relationship is linearized in a simplified manner, using a value obtained by partially differentiating trajectory length L with respect to parameter r.

Figure 13:
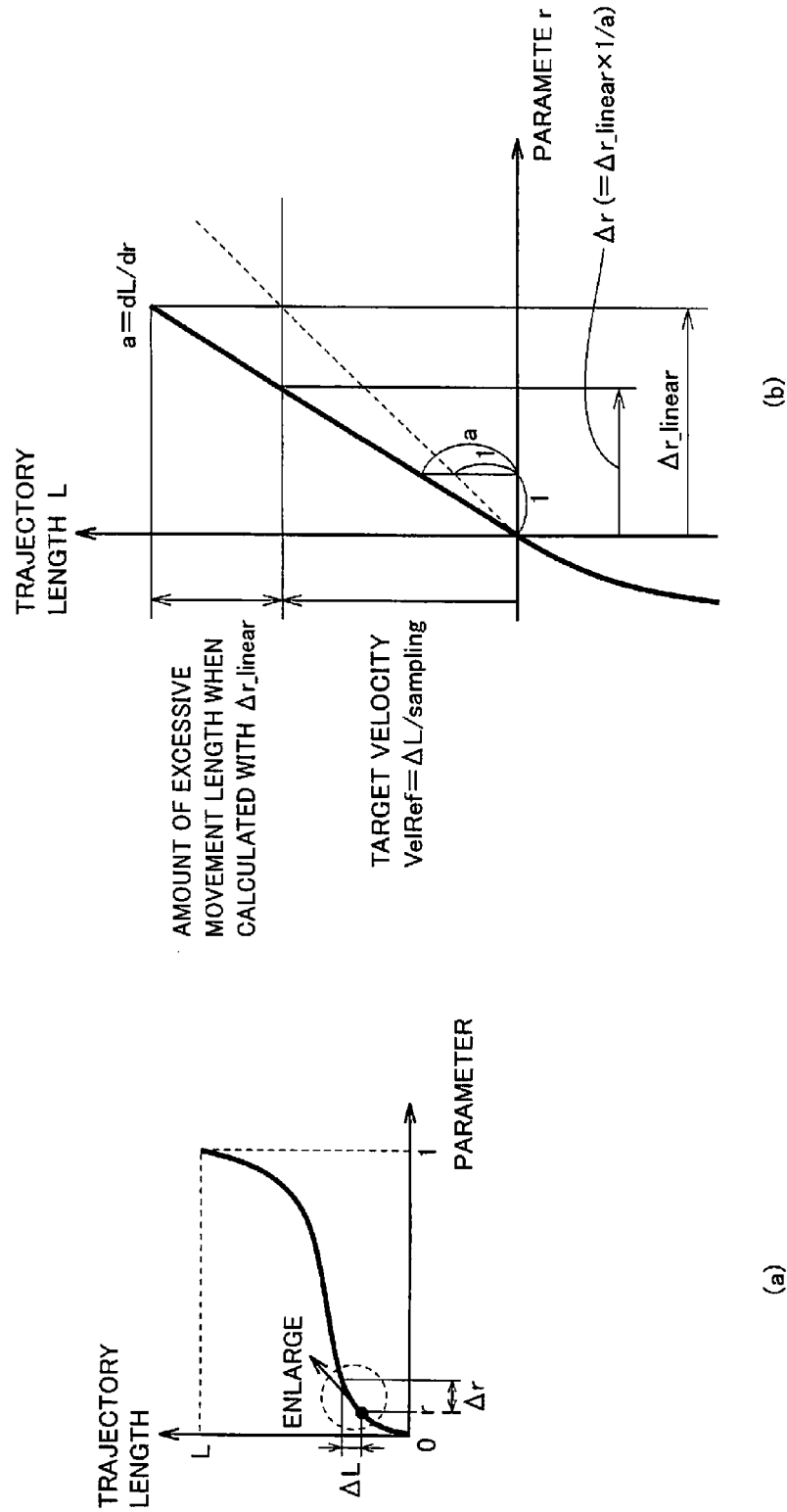
FIG. 13 is a diagram for describing a method for calculating a parameter increment with respect to a variation in trajectory length in the control logic according to the present embodiment.

FIG. 13 is a diagram for describing a method for calculating parameter increment Δr with respect to variation ΔL in trajectory length in the control logic according to the present embodiment.

Basically, as shown in FIG. 13(a), an inclination a (=dL/dr) of trajectory length L with respect to a certain parameter r is calculated. Now, assuming that the relationship between parameter r and trajectory length L is linear (property indicated by a broken line), variation ΔL in trajectory length corresponding to target velocity VelRef corresponds to a parameter increment Δr_linear.

On the other hand, according to the original relationship (nonlinear relationship) between parameter r and trajectory length L, a variation in trajectory length corresponding to parameter increment Δr_linear corresponds to a total of target velocity VelRef and an amount of excessive movement length when calculated with parameter increment Δr_linear.

Therefore, parameter increment Δr required to achieve target velocity VelRef using inclination a (=dL/dr) of trajectory length L about parameter r can be calculated as a value obtained by multiplying parameter increment Δr_linear by an inverse of inclination a of trajectory length L.

In other words, parameter increment Δr is calculated as parameter increment Δr=parameter increment Δr_linear×1/a.

Inclination a (=dL/dr) of trajectory length L is obtained by retaining a derivative (first differentiation equation) of parameter increment Δr with respect to trajectory length L in advance and sequentially calculating this derivative.

Furthermore, parameter r indicating the target position on the target trajectory in the next control period is updated based on parameter increment Δr obtained by the aforementioned calculation process (r(t+1)=r(t)+Δr(t)). The position instruction (target position) is provided such that the arm portion of movable mechanism 4 moves to a position (target position P(r(t+1))) on the target trajectory indicated by this updated parameter r. In other words, an accumulated error pulse for moving the arm portion of movable mechanism 4 to the newly calculated position is provided from MC unit 24 to motor drivers 31, 32 and 33.

As described above, the movement instruction provided to movable mechanism 4 includes calculating a distance to be traveled by the arm portion of movable mechanism 4 (variation ΔL in trajectory length) to correspond to the new target movement velocity value (target velocity VelRef), calculating a position (target position P(r)) to be reached by the arm portion of movable mechanism 4 on the target trajectory to correspond to the distance to be traveled by the arm portion of movable mechanism 4 (variation ΔL in trajectory length), and calculating a movement instruction (accumulated error pulse) for each of the plurality of drive shafts to correspond to the position to be reached by the arm portion of movable mechanism 4.

<I. Functional Block Diagram>

Next, description will be given to functional blocks for implementing a series of the aforementioned processes.

Figure 14:
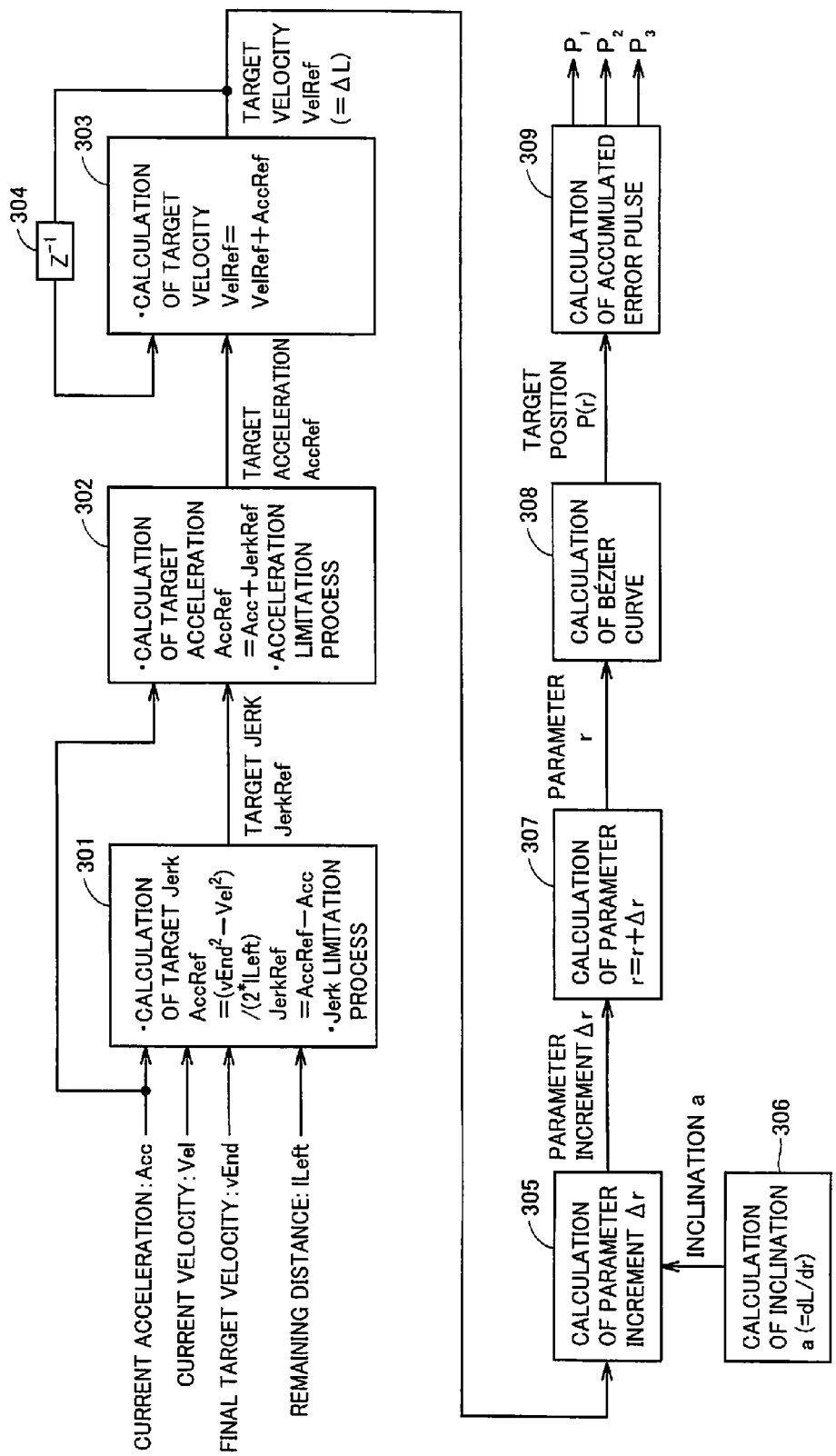
FIG. 14 is a schematic view showing functional blocks for implementing the control logic according to the present embodiment.

FIG. 14 is a schematic view showing the functional blocks for implementing the control logic according to the present embodiment.

Referring to FIG. 14, the control logic according to the present embodiment includes a Jerk processing module 301, an acceleration processing module 302, a target velocity calculation module 303, a delay module 304, a parameter increment calculation module 305, an inclination calculation module 306, a parameter calculation module 307, a Bézier curve calculation module 308, and an accumulated error pulse calculation module 309.

Jerk processing module 301 limits a jerk generated from the control instruction provided to motors 41, 42 and 43 (FIG. 2), such that the jerk does not exceed a predetermined limit value (Jerk limit value jMaxLim). In other words, Jerk processing module 301 calculates target acceleration AccRef, and evaluates magnitude of the jerk by comparing this calculated target acceleration AccRef and a current acceleration Acc.

More specifically, current acceleration Acc, current velocity Vel, final target velocity vEnd, (estimated) remaining distance lLeft are inputted to Jerk processing module 301. Then, Jerk processing module 301 calculates target acceleration AccRef in accordance with AccRef=(vEnd$^2$−Vel$^2$)/(2×lLeft). Next, in accordance with JerkRef=AccRef−Acc, Jerk processing module 301 calculates a target jerk JerkRef corresponding to this calculated target acceleration AccRef.

Next, Jerk processing module 301 determines whether or not calculated target jerk JerkRef exceeds predetermined Jerk limit value jMaxLim. If calculated target jerk JerkRef exceeds Jerk limit value jMaxLim, Jerk processing module 301 outputs a value of Jerk limit value jMaxLim as target jerk JerkRef. If not, Jerk processing module 301 outputs a value of calculated target jerk JerkRef.

Acceleration processing module 302 limits an acceleration generated from the control instruction provided to motors 41, 42 and 43 (FIG. 2), such that the acceleration does not exceed a predetermined limit value (acceleration limit value aMaxLim). In other words, acceleration processing module 302 calculates target acceleration AccRef, and evaluates magnitude of this calculated target acceleration AccRef.

More specifically, current acceleration Acc and target jerk JerkRef are inputted to acceleration processing module 302. Then, acceleration processing module 302 calculates target acceleration AccRef in accordance with AccRef=Acc+JerkRef. Next, acceleration processing module 302 determines whether or not calculated target acceleration AccRef exceeds predetermined acceleration limit value aMaxLim. If this calculated target acceleration AccRef exceeds acceleration limit value aMaxLim, acceleration processing module 302 outputs a value of acceleration limit value aMaxLim as target acceleration AccRef. If not, acceleration processing module 302 outputs a value of calculated acceleration limit value aMaxLim.

Target velocity calculation module 303 calculates target velocity VelRef. More specifically, target velocity VelRef in the immediately preceding control period is inputted to target velocity calculation module 303 through delay module 304, and target acceleration AccRef calculated by acceleration processing module 302 is inputted to target velocity calculation module 303. Then, target velocity calculation module 303 calculates a target velocity VelRef(t) in this time's control period in accordance with VelRef(t)=VelRef(t−1)+AccRef.

In target velocity calculation module 303, a process of limiting calculated target velocity VelRef is not necessary. This is because a limit value of target velocity VelRef is final target velocity vEnd, and target jerk JerkRef and target acceleration AccRef are calculated using this final target velocity vEnd.

Parameter increment calculation module 305 calculates parameter increment Δr corresponding to target velocity VelRef (variation ΔL in trajectory length) calculated by target velocity calculation module 303. At this time, inclination a (=dL/dr) of trajectory length L about parameter r is necessary, and thus, inclination calculation module 306 calculates inclination a (=dL/dr) of trajectory length L corresponding to parameter r at this time point synchronously with the process by parameter increment calculation module 305. The detailed process in parameter increment calculation module 305 has been described with reference to FIG. 13, and thus, description thereof will not be repeated here.

Typically, inclination calculation module 306 retains in advance the derivative (first differentiation equation) about parameter increment Δr calculated from a function of trajectory length L corresponding to target position P(r) on the preset Bézier curve.

Parameter increment Δr calculated in parameter increment calculation module 305 is inputted to parameter calculation module 307. Then, parameter calculation module 307 calculates parameter r(t) in this time's control period in accordance with r(t)=r(t−1)+AccRef.

Bézier curve calculation module 308 calculates target position P(r) based on parameter r calculated in parameter calculation module 307. In other words, calculated target position P(r) indicates a coordinate to be reached by the arm portion of movable mechanism 4.

Accumulated error pulse calculation module 309 calculates amounts to be traveled by motors 41, 42 and 43 in this control period, based on target position P(r) calculated by Bézier curve calculation module 308. Then, accumulated error pulse calculation module 309 calculates the number of accumulated error pulses $P_1$, $P_2$ and $P_3$ to be provided to motor drivers 31, 32 and 33, respectively.

<J. Operation Example>

Next, description will be given to one example of a behavior of movable mechanism 4 obtained by the control logic according to the present embodiment.

Figure 15:
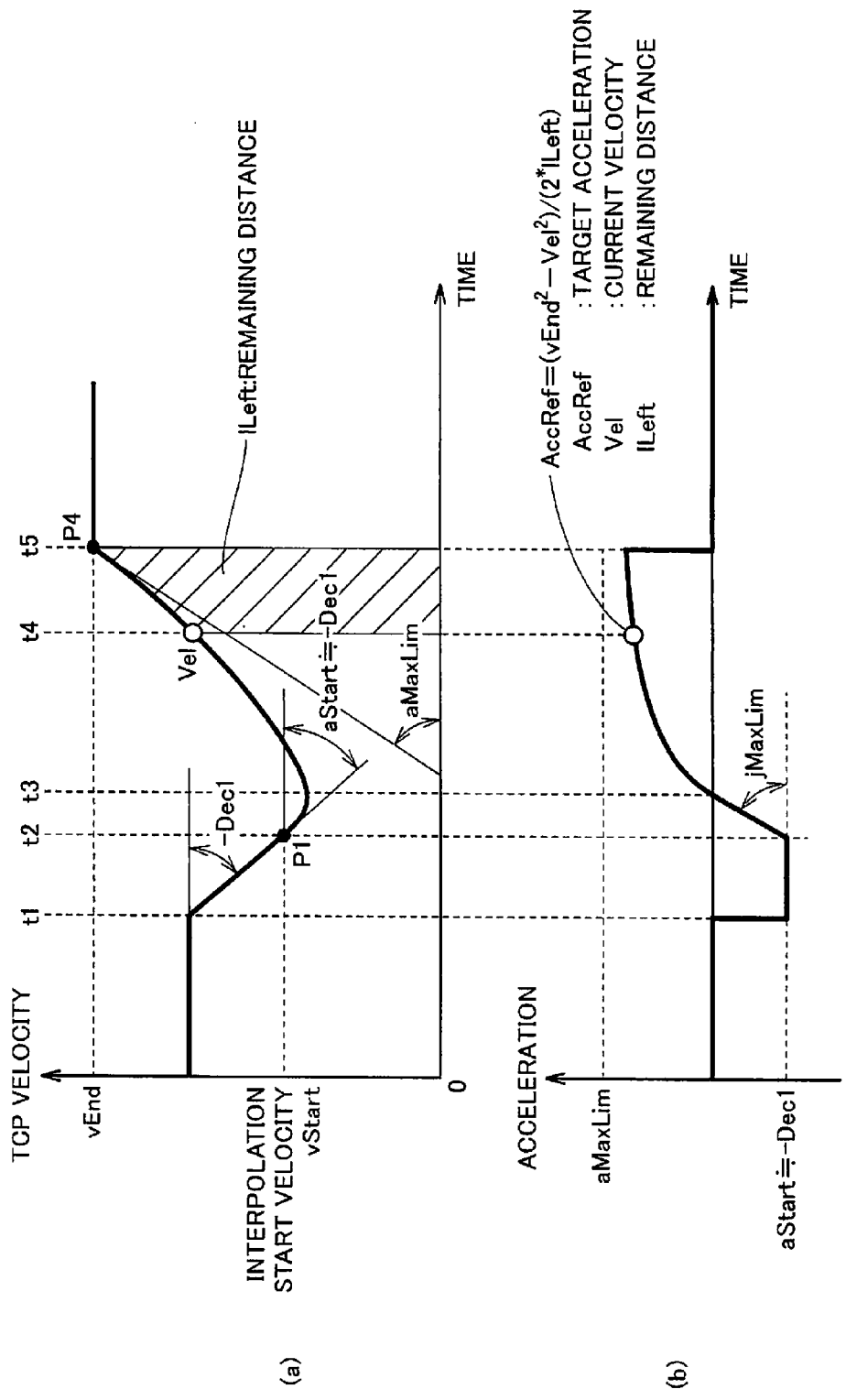
FIG. 15 is a time chart showing an example of a behavior of a movable mechanism obtained by the control logic according to the present embodiment.

FIG. 15 is a time chart showing the example of the behavior of movable mechanism 4 obtained by the control logic according to the present embodiment. FIG. 15(*a*) shows an example of a temporal change in movement velocity (TCP velocity) of the arm portion of movable mechanism 4. FIG. 15(*b*) shows an example of a temporal change in acceleration of the arm portion of movable mechanism 4.

In the process of cutting and shaping the work, the velocity during cutting is often set to be relatively lower than the velocity at which the arm portion of movable mechanism 4 approaches work 2. Therefore, FIGS. 15(*a*) and (*b*) show an example in which decrease in TCP velocity of the arm portion of movable mechanism 4 at a predetermined rate (acceleration−Dec1) starts at time t1 as a preprocess for start of cutting. Assume that the TCP velocity decreases to an interpolation start velocity vStart at time t2. This interpolation start velocity vStart may be set in accordance with a material of the work to be processed.

Then, assume that the target trajectory is generated at time t2. In other words, the position of the arm portion of movable mechanism 4 at time t2 is determined as start point P1, and end point P4 is determined in accordance with this start point P1. Then, control vector 1 is determined based on start point P1 and control point P2, and control vector 2 is determined based on control point P3 and end point P4. The Bézier curve, i.e., target trajectory is finally determined based on these control vectors 1 and 2 (see FIG. 8).

After time t2, the TCP velocity is gradually changed such that the TCP velocity attains final target velocity vEnd at end point P4. In order to maintain continuity of the velocity, an interpolation start acceleration aStart at time t2 is maintained to have magnitude that is substantially similar to the immediately preceding acceleration (−Dec1).

As described above, target acceleration AccRef is calculated based on remaining distance lLeft estimated in each control period. However, a difference between interpolation start velocity vStart and final target velocity vEnd is large immediately after movement starts. Therefore, a variation in TCP velocity is limited by a limit about the jerk (Jerk limit value jMaxLim).

However, a difference between the TCP velocity (current velocity Vel) and final target velocity vEnd becomes smaller after time t3. Therefore, it can be seen that the TCP velocity (current velocity Vel) gradually approaches final target velocity vEnd in accordance with target acceleration AccRef calculated in each control period. Then, it can be seen that when the arm portion of movable mechanism 4 reaches the end point at time t5, the TCP velocity (current velocity Vel) at this time point matches final target velocity vEnd.

As shown in FIG. 15(*b*), it can be seen that during a period from time t3 to t5, target acceleration AccRef does not fluctuate greatly and gradually approaches the predetermined limit value (acceleration limit value aMaxLim).

<K. Overall Process Flow>

The aforementioned overall process procedure of the control logic according to the present embodiment can be summarized as follows.

Figure 16:
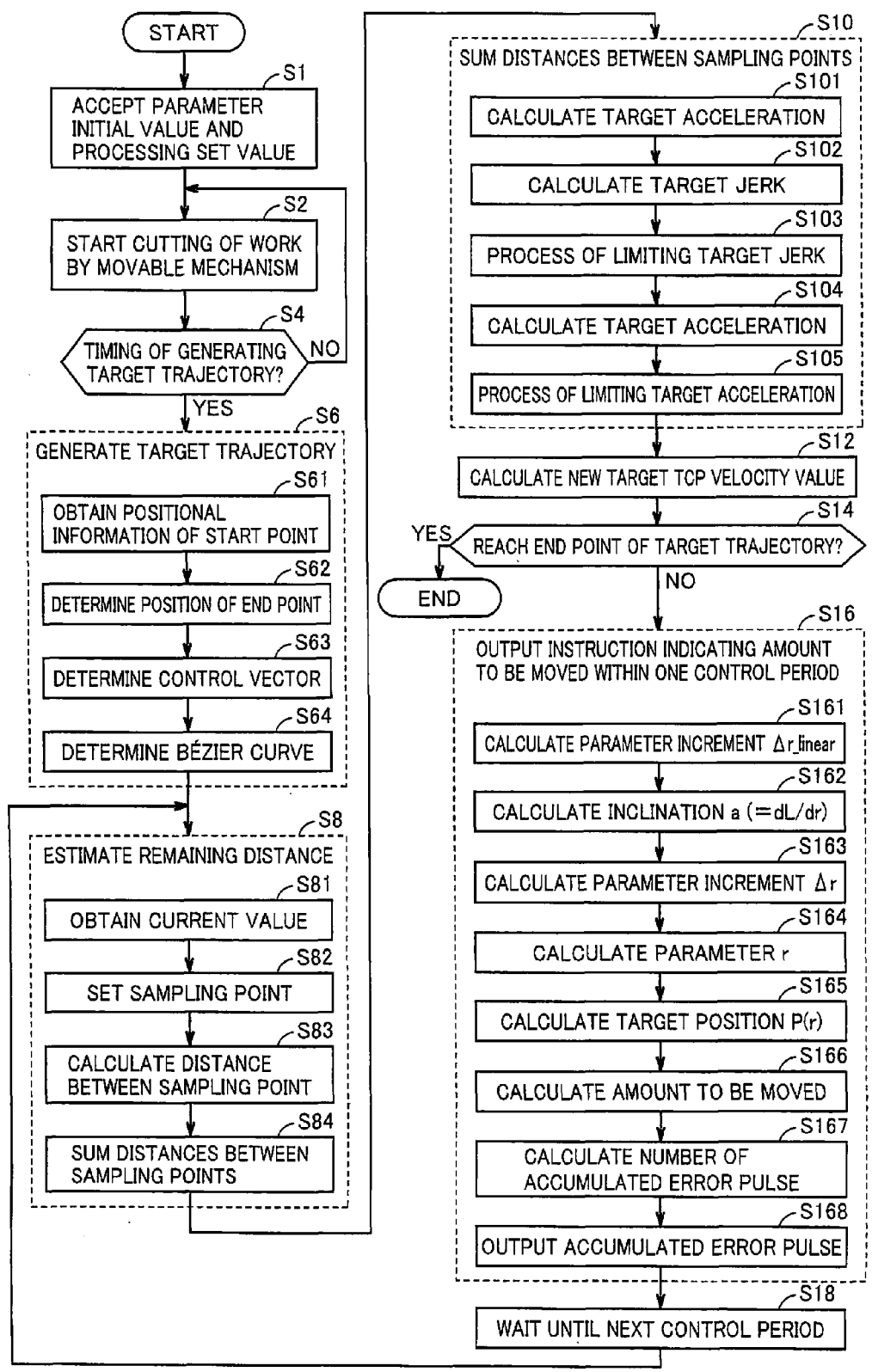
FIG. 16 is a flowchart showing an overall process procedure of the control logic according to the present embodiment.

FIG. 16 is a flowchart showing the overall process procedure of the control logic according to the present embodiment. The same reference numerals are allotted to the steps that are substantially the same as the steps included in the flowchart in FIG. 4, among the steps included in the flowchart in FIG. 16.

Although each step shown in FIG. 16 is executed by control apparatus 1, a main body executing each step varies depending on a form of mounting. In other words, main processing unit 22 (see FIG. 2) may execute all processes, or main processing unit 22 and MC unit 24 (see FIG. 2) may execute the processes in collaboration.

Referring to FIG. 16, control apparatus 1 accepts a parameter initial value and a processing set value (step S1). This parameter initial value includes interpolation start velocity vStart, final target velocity vEnd, interpolation start acceleration aStart, acceleration limit value aMaxLim, Jerk limit value jMaxLim, and the like. The processing set value includes a machining program for generating the target trajectory, conditions for setting the control points, and the like. Next, cutting of work 2 by movable mechanism 4 starts (step S2).

Next, it is determined whether or not the timing of generating the target trajectory has come (step S4). If the timing of generating the target trajectory does not come (NO in step S4), the process in step S4 is repeated. On the other hand, if the timing of generating the target trajectory has come (YES in step S4), the target trajectory is generated for the movement section defined by the start point and the end point (step S6).

This generation of the target trajectory includes a process of obtaining positional information of start point P1 (step S61), a process of determining a position of end point P4 corresponding to start point P1 (step S62), a process of determining control vector 1 based on start point P1 and control point P2 as well as control vector 2 based on control point P3 and end point P4 (step S63), and a process of determining the Bézier curve based on control vector 1 and control vector 2 (step S64).

Next, the remaining distance along the target trajectory from the current position to the end point is estimated (step S8). This estimation of the remaining distance includes a process of obtaining a current value of the TCP (information indicating the current position) of movable mechanism 4 (step S81), a process of setting the predetermined certain number of sampling points for the section along the target trajectory from the current position to the end point (step S82), a process of calculating a distance between adjacent sampling points (step S83), and a process of calculating the remaining distance by summing the distances between the sampling points (step S84).

Next, the target acceleration is calculated (step S10). This calculation of the target acceleration includes a process of calculating target acceleration AccRef using current velocity Vel, final target velocity vEnd and estimated remaining distance lLeft (step S101), a process of calculating target jerk JerkRef using calculated target acceleration AccRef (step S102), a process of limiting calculated target jerk JerkRef (step S103), a process of calculating target acceleration AccRef using target jerk JerkRef after the limitation process (step S104), and a process of limiting calculated target acceleration AccRef (step S105).

Next, the new target TCP velocity value (target velocity VelRef) is calculated by correcting the current TCP velocity (current velocity Vel) with target acceleration (target acceleration AccRef) calculated in step S10 (step S12).

It is determined whether or not the TCP has reached the end point of the set target trajectory (step S14). If the TCP has reached the end point of the set target trajectory (YES in step S14), motion control based on this time's target trajectory is finished. On the other hand, if the TCP does not reach the end point of the set target trajectory (NO in step S14), the instruction indicating the amount to be moved by the movable unit of movable mechanism 4 within one control period is outputted (step S16).

This process of outputting the instruction includes a process of calculating parameter increment Δr_linear corresponding to variation ΔL in trajectory length corresponding to calculated target velocity VelRef, assuming that parameter r and trajectory length L are linear (see FIG. 13) (step S161), a process of calculating inclination a (=dL/dr) of trajectory length L about parameter r (step S162), a process of calculating parameter increment Δr by multiplying parameter increment Δr_linear by an inverse of inclination a of trajectory length L (step S163), a process of calculating parameter r in this time's control period using calculated parameter increment Δr (step S164), a process of calculating target position P(r) using calculated parameter r (step S165), a process of calculating the amount to be moved within this control period using calculated target position P(r) (step S166), a process of calculating the number of accumulated error pulses $P_1$, $P_2$ and $P_3$ to be provided to motor drivers 31, 32 and 33, respectively (step S167), and a process of outputting the calculated number of accumulated error pulses $P_1$, $P_2$ and $P_3$ from MC unit 24 to motor drivers 31, 32 and 33 (step S168).

Then, the process waits until the next control period (step S18), and the processes in step S8 and the subsequent steps are repeated.

In the process in step S16, an actually generated acceleration may be calculated from the encoders provided at motors 41, 42 and 43 and detecting the rotational positions of the servomotors, and a difference between the acceleration and the target acceleration (target acceleration AccRef) may be evaluated as an acceleration error, and this acceleration error may be reflected in the process in the next control period. As a result, even when the motors do not follow the instruction due to overload, the behavior thereof can be corrected in a feedback manner.

<L. Modification>

(l1: Example of Process of Maximizing Range where Movement Velocity on Target Trajectory can be Maintained Constant)

Depending on application, there may also be the case where the TCP velocity during movement on the target trajectory (typically, during cutting) is maintained as constant as possible. By maintaining the TCP velocity at a fixed value as described above, the finish quality of the processed surface can be enhanced.

In a control logic according to this modification, under limitation by the acceleration limit value, the TCP velocity is maintained at an interpolation velocity Vint in a range where the final target velocity can be reached at the end point of the target trajectory. In other words, the TCP velocity is decreased to interpolation velocity Vint, and then, the timing of starting increase in TCP velocity to reach final target velocity vEnd at the end point of the target trajectory is delayed as much as possible.

Figure 17:
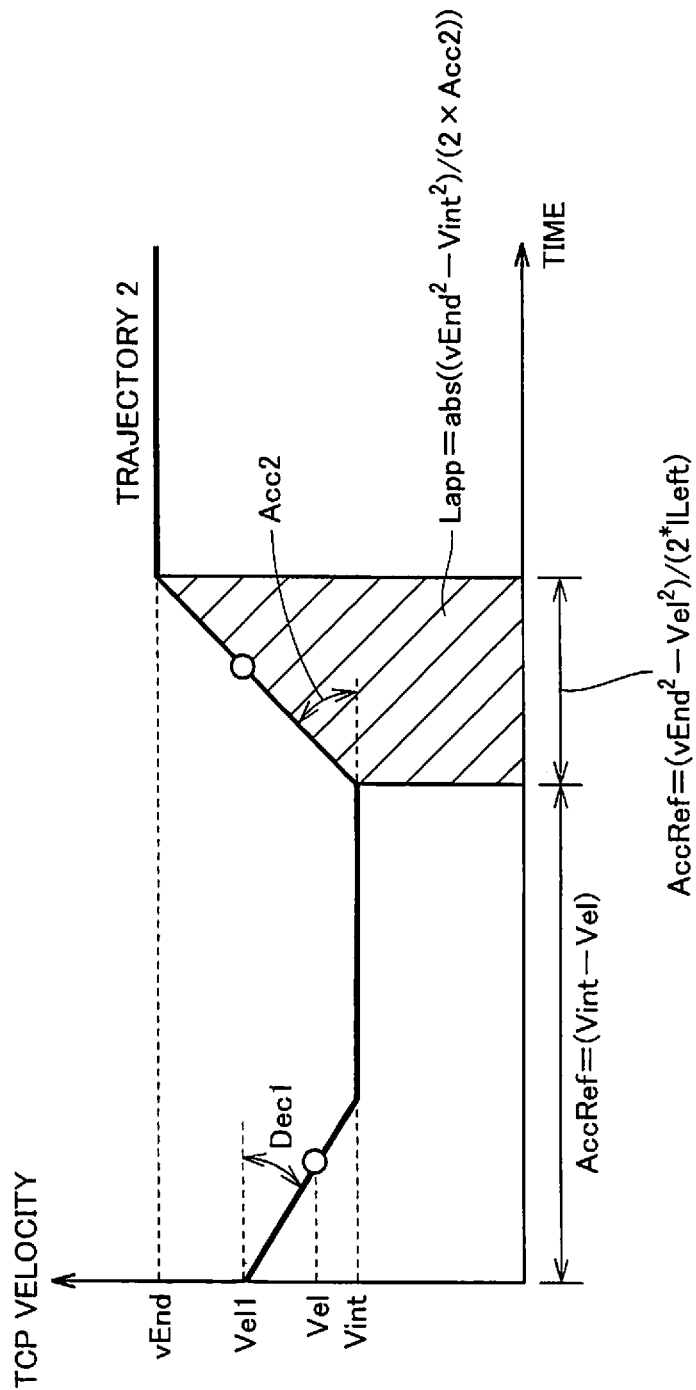
FIG. 17 is a time chart showing a TCP velocity of the movable mechanism obtained by control logic according to a modification of the present embodiment.

FIG. 17 is a time chart showing the TCP velocity of movable mechanism 4 obtained by the control logic according to the modification of the present embodiment. Referring to FIG. 17, first, when the process starts, current velocity Vel (current velocity Vel1 at the time of start) is reduced to interpolation velocity Vint under limitation by deceleration limit Dec1. At this time, target acceleration AccRef is calculated in accordance with the following equation:

AccRef=(Vint−Vel)

Here, if AccRef<Dec1, AccRef=Dec1.

Therefore, since target acceleration AccRef becomes zero after current velocity Vel is decreased to interpolation velocity Vint, current velocity Vel is maintained at interpolation velocity Vint.

In addition, a velocity change start distance Lapp is calculated in advance in accordance with the following equation. Here, Acc2 is an acceleration limit value.

Lapp=abs((vEnd²−Vel²)/2×lLeft)/(2×Acc2)

Then, in each control period, remaining distance lLeft is sequentially estimated, and when this estimated remaining distance lLeft substantially matches velocity change start distance Lapp, the TCP velocity increases to final target velocity vEnd under limitation by acceleration limit value Acc2.

By employing the aforementioned process, a section where the TCP velocity can be maintained at interpolation velocity Vint can be maximized, and thus, the quality of the processed surface of the work can be enhanced.

<M. Functional Effect>

According to the embodiments of the present invention, the current velocity is increased and decreased at the acceleration having as small fluctuations as possible, such that the TCP velocity at the end point of the preset target trajectory matches the final target velocity. In other words, the TCP velocity changes smoothly toward the final target velocity, and continuity with the target velocity in the subsequent trajectory can also be maintained. As a result, uniformity of the finished surface can be enhanced.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

1 control apparatus; 2 work; 3 measure; 4 movable mechanism; 5 switch; 21 power supply unit; 22 main processing unit; 23 IO unit; 24 MC unit; 25 back plane; 31, 32, 33 motor driver; 41, 42, 43 motor; 60 communication line; 221 microprocessor; 223 buffer memory; 225 communication interface; 226 user memory; 231 processing circuit; 232, 243 input circuit; 233, 244 output circuit; 242 controller interface; 301 Jerk processing module; 302 acceleration processing module; 303 target velocity calculation module; 304 delay module; 305 parameter increment calculation module; 306 inclination calculation module; 307 parameter calculation module; 308 Bézier curve calculation module; 309 accumulated error pulse calculation module; SYS system.

The invention claimed is:

1. A control apparatus for controlling a device having a movable unit movable by a plurality of drive shafts, comprising:
   a memory having a program thereon; and
   a processor connected to said memory, said processor, when executing the program, being configured to perform operations comprising:
   when a predetermined condition is satisfied, generating a target trajectory for movement of the movable unit along a movement section defined by a start point and an end point;
   estimating for a control period, a remaining distance along said target trajectory from a current position to said end point;
   calculating for the control period, based on the estimated remaining distance, a target acceleration by which a velocity of said movable unit varies from a current movement velocity to a final target velocity such that the velocity of said movable unit at the end of the trajectory matches a final target velocity when said movable unit moves by said remaining distance;
   calculating for a next control period, a new target movement velocity value by correcting said current movement velocity with the calculated target acceleration, and setting a predetermined number of sampling points defining one or more sections along said target trajectory from said current position to said end point to estimate said remaining distance, wherein said processor is configured to estimate said remaining distance such that setting said predetermined number of sampling points comprises setting said sampling points such that in a section of the target trajectory closer to said current position a spacing of said sampling points is closer than a spacing of said sampling points in a section of the target trajectory farther from said current position.

2. The control apparatus according to claim 1, wherein said processor is configured to perform operations such that calculating the target acceleration comprises calculating the target acceleration repeatedly in each of the control period and the next control period.

3. The control apparatus according to claim 1, wherein said target trajectory is defined in a form of a function including a parameter.

4. The control apparatus according to claim 1, wherein said processor is configured to perform operations further comprising outputting an instruction indicating an amount to be traveled by said movable unit within one control period so as to be moving at the calculated new target movement velocity value, wherein said processor is configured to perform operations such that calculating the new target movement velocity value comprises:
   calculating a distance to be traveled by said movable unit to correspond to said new target movement velocity value;
   calculating a position to be reached by said movable unit on said target trajectory to correspond to the distance to be traveled by said movable unit; and
   calculating a movement instruction for each of said drive shafts to correspond to the position to be reached by said movable unit.

5. The control apparatus according to claim 3, wherein said target trajectory is defined by Bézier curve.

6. The control apparatus according to claim 1, wherein said processor is configured to perform operations such that generating said target trajectory comprises generating said target trajectory in response to an externally received signal.

7. The control apparatus according to claim 1, wherein said processor is configured to perform operations such that calculating said new target movement velocity comprises calculating said new target movement velocity value such that at least one of the target acceleration and a variation of a jerk is maintained within a predetermined limit.

8. A control system comprising:
   a movable mechanism having a movable unit movable by a plurality of drive shafts;
   a driver for driving said movable mechanism; and
   a control apparatus providing a control instruction to said driver, said control apparatus configured with instructions to perform operations comprising:
   generating a target trajectory for movement of the movable unit along a movement section defined by a start point and an end point;
   estimating a remaining distance along said trajectory from a current position to said end point;
   calculating based on the estimated remaining distance, a target acceleration by which a velocity of said movable unit varies from a current movement velocity to a final target velocity such that the velocity of the movable unit at the end of the trajectory matches a final target velocity when said movable unit moves by said remaining distance;
   calculating a new target movement velocity value by correcting said current movement velocity with the calculated target acceleration, and setting a predetermined number of sampling points defining one or more sections along said target trajectory from said current position to said end point to estimate said remaining distance, wherein said control apparatus is configured to estimate said remaining distance such that setting said predetermined number of sampling points comprises setting said sampling points such that a spacing of said sampling points in a section of the target trajectory closer to said current position is closer than a spacing of said sampling points in a section of the target trajectory farther from said current position.

9. A method for controlling a device having a movable unit movable by a plurality of drive shafts, comprising:
   generating a target trajectory for movement of the movable unit along a movement section defined by a start point and an end point;
   estimating a remaining distance along said target trajectory from a current position to said end point;
   calculating based on the estimated remaining distance, a target acceleration by which a velocity of said movable unit varies from a current movement velocity to a final target velocity such that the velocity of the movable unit at the end of the trajectory matches a final target velocity when said movable unit moves by said remaining distance;

calculating a new target movement velocity value by correcting said current movement velocity with the calculated target acceleration, and setting a predetermined number of sampling points defining one or more sections along said target trajectory from said current position to said end point to estimate said remaining distance, wherein setting said predetermined number of sampling points comprises setting said sampling points such that a spacing of said sampling points in a section of the target trajectory closer to said current position is closer than a spacing of said sampling points in a section of the target trajectory farther from said current position.

10. The control system according to claim 8, wherein the control apparatus is configured to perform operations such that calculating the target acceleration comprises calculating the target acceleration repeatedly in each of the control period and the next control period.

11. The control system according to claim 8, wherein said target trajectory is defined in a form of a function including a parameter.

12. The control system according to claim 8, wherein the control apparatus is configured to perform operations further comprising outputting an instruction indicating an amount to be traveled by said movable unit within one control period so as to be moving at said new target movement velocity value calculated by said movement velocity updating unit, wherein the control apparatus is configured to perform operations such that calculating the new target movement velocity value comprises:

calculating a distance to be traveled by said movable unit to correspond to said new target movement velocity value;

calculating a position to be reached by said movable unit on said target trajectory to correspond to the distance to be traveled by said movable unit; and calculating a movement instruction for each of said drive shafts to correspond to the position to be reached by said movable unit.

13. The control system according to claim 11, wherein said target trajectory is defined by Bézier curve.

14. The control system according to claim 8, wherein said control apparatus is configured to perform operations such that generating said target trajectory comprises generating said target trajectory in response to an externally received signal.

15. The control system according to claim 8, wherein the control apparatus is configured to perform operations such that calculating said new target movement velocity value comprises calculating said new target movement velocity value such that at least one of the target acceleration and a variation of a jerk is maintained within a predetermined limit.

16. The method according to claim 9, wherein calculating the target acceleration comprises calculating the target acceleration repeatedly in each of the control period and the next control period.

17. The method according to claim 9, wherein said target trajectory is defined in a form of a function including a parameter.

18. The method according to claim 9, further comprising outputting an instruction indicating an amount to be traveled by said movable unit within one control period so as to be moving at said new target movement velocity value by:

calculating a distance to be traveled by said movable unit to correspond to said new target movement velocity value;

calculating a position to be reached by said movable unit on said preset target trajectory to correspond to the distance to be traveled by said movable unit; and calculating a movement instruction for each of said drive shafts to correspond to the position to be reached by said movable unit.

19. The method according to claim 17, wherein said target trajectory is defined by Bézier curve.

20. The method according to claim 9, wherein generating said target trajectory is performed in response to an externally received signal.

21. The method according to claim 9, wherein calculating said new target movement velocity value is performed such that at least one of the target acceleration and a variation of a jerk is maintained within a predetermined limit.

* * * * *